US011845420B2

(12) United States Patent
Ravichandran et al.

(10) Patent No.: US 11,845,420 B2
(45) Date of Patent: Dec. 19, 2023

(54) METHODS AND SYSTEMS FOR COORDINATED SHAPING OF HEV BASE TORQUE

(71) Applicant: Ford Global Technologies, LLC, Dearborn, MI (US)

(72) Inventors: Maruthi Thiruninravur Ravichandran, Kalamazoo, MI (US); Jason Meyer, Canton, MI (US); Bhavesh Ravindra Paradkar, Canton, MI (US); Rajit Johri, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 421 days.

(21) Appl. No.: 16/706,062

(22) Filed: Dec. 6, 2019

(65) Prior Publication Data

US 2021/0171012 A1 Jun. 10, 2021

(51) Int. Cl.
*B60W 20/17* (2016.01)
*B60W 30/20* (2006.01)
(Continued)

(52) U.S. Cl.
CPC ............ *B60W 20/17* (2016.01); *B60W 10/06* (2013.01); *B60W 10/08* (2013.01); *B60W 30/20* (2013.01);
(Continued)

(58) Field of Classification Search
CPC ...... B60W 20/17; B60W 10/06; B60W 10/08; B60W 2540/106; B60W 2555/40; B60W 2710/0605; B60W 2710/0638; B60W 2710/0666; B60W 2710/0672; B60W 30/20; B60W 2510/244; B60W 2520/16; B60W 2520/40; B60W 2540/10;
(Continued)

(56) References Cited

U.S. PATENT DOCUMENTS 7,676,315 B2  3/2010 Doering et al.
7,917,275 B2  3/2011 Doering et al.
(Continued)

FOREIGN PATENT DOCUMENTS

DE  102016200578      *  8/2016  ............ F02D 11/105
DE  102016200578 A1  *  8/2016  ............. F02D 17/02

OTHER PUBLICATIONS

Hermansson, V. et al., "Control of an Electric Vehicle Powertrain to Mitigate Shunt and Shuffle," Master of Automotive Engineering Thesis, Chalmers University of Technology, Department of Signals and Systems, Jan. 6, 2016, 99 pages.

*Primary Examiner* — Vivek D Koppikar
*Assistant Examiner* — Joan T Goodbody
(74) *Attorney, Agent, or Firm* — David Kelley; McCoy Russell LLP

(57) ABSTRACT

A vehicle operating method comprising generating a base torque reserve for an engine based on a position of an accelerator pedal and a position rate of change of the accelerator pedal, where the base torque reserve is an air reserve of the engine generated by the engine. The base torque reserve may further be generated based on one or more of a drive mode, a vehicle altitude, a battery state of charge (SOC), and a transmission gear, in at least one example.

20 Claims, 7 Drawing Sheets

(51) Int. Cl.
*B60W 10/06* (2006.01)
*B60W 10/08* (2006.01)

(52) U.S. Cl.
CPC ... *B60W 2510/244* (2013.01); *B60W 2520/16* (2013.01); *B60W 2520/40* (2013.01); *B60W 2540/10* (2013.01)

(58) Field of Classification Search
CPC ............... B60W 20/19; B60W 20/15; B60W 2510/1005; B60W 2710/06; B60K 2006/4808; B60K 2006/4825; B60K 6/485; B60Y 2400/435; Y02T 10/62
See application file for complete search history.

(56) References Cited

U.S. PATENT DOCUMENTS

| | | | |
|---|---|---|---|
| 8,239,113 B2 | 8/2012 | Doering et al. | |
| 8,332,111 B2 | 12/2012 | McDonnell et al. | |
| 8,447,491 B2 | 5/2013 | Templin | |
| 8,594,904 B2 | 11/2013 | Livshiz et al. | |
| 8,635,001 B2 | 1/2014 | Doering et al. | |
| 8,793,057 B2 | 7/2014 | McDonnell et al. | |
| 8,825,340 B2 | 9/2014 | Kim et al. | |
| 9,154,072 B2 | 10/2015 | Jung et al. | |
| 9,227,619 B2 | 1/2016 | Doering et al. | |
| 9,707,968 B2 | 7/2017 | Wall et al. | |
| 2005/0011689 A1* | 1/2005 | Tajima | B60K 6/40 903/951 |
| 2009/0270225 A1* | 10/2009 | Whitney | F02D 37/02 477/115 |
| 2009/0299602 A1* | 12/2009 | Hartrey | F02D 41/1497 701/102 |
| 2015/0051808 A1* | 2/2015 | Keller | F02D 41/12 701/102 |
| 2016/0138713 A1* | 5/2016 | Cho | F16H 63/46 701/53 |
| 2018/0037219 A1* | 2/2018 | Johri | B60W 30/18072 |
| 2018/0202545 A1* | 7/2018 | Zhao | B60W 10/08 |
| 2019/0143960 A1 | 3/2019 | Johri et al. | |

* cited by examiner

METHODS AND SYSTEMS FOR COORDINATED SHAPING OF HEV BASE TORQUE

FIELD

The present description relates generally to methods and systems for controlling a vehicle to reduce issues of noise, vibration, and harshness (NVH).

BACKGROUND/SUMMARY

Vehicle powertrains contain both backlash and compliance, making it difficult to transmit torque from one or more torque actuators to wheels of the vehicle in a smooth manner. If the torques commands output to the torque actuators are not appropriately shaped, undesirable NVH such as clunk and shuffle results, and a driver experience is degraded.

Managing such NVH is complex due to numerous devices that engage and disengage with the powertrain of the vehicle. Moreover, in the context of hybrid electric vehicles (HEVs), NVH may be especially complicated due to a plurality of actuators and different actuator types (e.g., combustion engine and motor/s) that are located at different positions of the powertrain.

The amount of torque provided to the powertrain via a combustion engine may be varied by modifying a flow of air charge and a spark timing of the combustion engine. It is noted that torque produced via modifying the flow of air charge for a combustion engine is referred to as base torque, while torque produced via modifying the spark timing for the combustion engine is referred to herein as an instantaneous torque.

Modifying the flow of air charge is relatively slow to producing torque compared to modifying the spark timing of the combustion engine. However, the combustion engine must first produce a sufficient amount of base torque before torque may be delivered to the powertrain via the instantaneous torque.

Other attempts to address powertrain NVH and to coordinate a shaping of HEV base torque include adjusting a motor torque output to provide a torque reserve. One example approach is shown by Johri et al. in U.S. Publication No. 2019/0143960. Therein, when motor torque is insufficient to provide a torque reserve during an upshift, a torque reserve is generated by increasing an engine torque and decreasing a motor torque during the upshift.

However, the inventors herein have recognized potential issues with such systems. For example, the inventors have recognized failure of previous approaches to take into account an acceleration pedal position and pedal rate of change for generating the base torque reserve to be problematic.

By failing to take into account the accelerator pedal position and pedal rate of change for generating a base torque reserve, base torque reserves that are either too small or too large may result. By generating base torque reserves that are too small, an insufficient base torque reserve may be available to satisfy downstream torque requests, especially if there is a sudden increase in driver torque request. Further, driver torque requests may be met more slowly than desired by the driver. In the case of base torque reserves that are too large, issues related to fuel inefficiency and NVH occur.

Moreover, traditional approaches lack of coordination between the input transmission actuators and the actuators situated at other locations in the drivetrain, which leads to non-connected response of the drivetrain during tip-ins. For example, such a non-connected response of the drivetrain during tip-ins may be due to an inappropriate selection of the input transmission actuator base torque reserve, as well as uncertainties in the engine torque delivery due to the absence of an input transmission actuator base torque reserve rate-limit.

Additionally, lack of coordination between the engine and a powertrain motor positioned upstream of the transmission may lead to overshoot in the shaped engine base torque command during tip-ins, due to the absence of a base torque limit for input transmission actuators and due to difficulties in accurately delivering the input transmission actuators torque request. Such difficulties in accurately delivering the input transmission actuators may be at least in part due to the above overshoot in the shaped engine base torque command during tip-ins.

In one example, the issues described above may be addressed by a powertrain operating method that generates an engine base torque reserve based on an accelerator pedal position and an accelerator pedal position rate of change. The technical effect of forming the base torque reserve based on the accelerator pedal position and the pedal rate of change is that an appropriate amount of base torque reserve is generated to satisfy a desired responsiveness of the vehicle, while avoiding degraded fuel economy and NVH.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
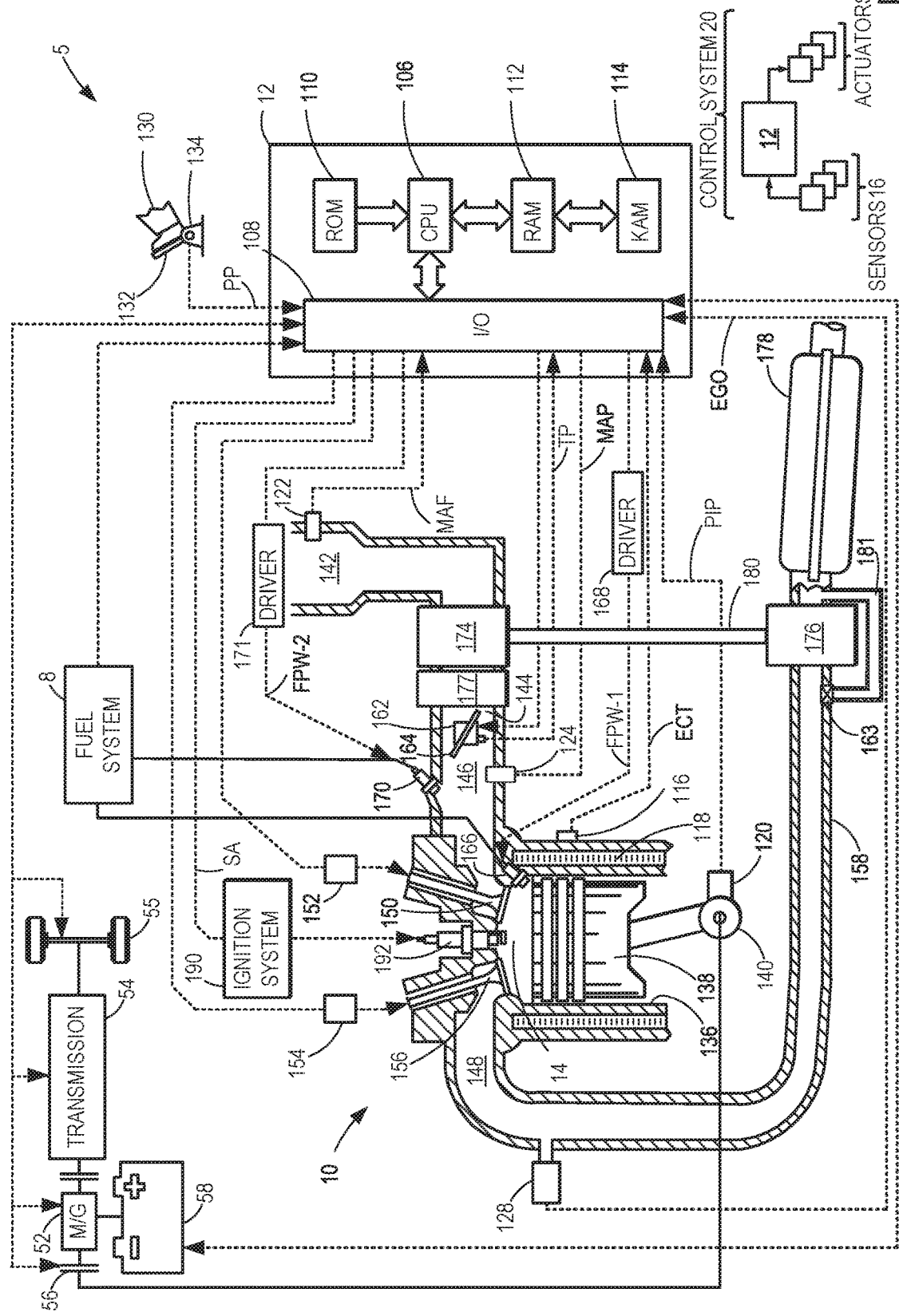
FIG. 1 shows a schematic diagram of a hybrid electric vehicle, according to one or more examples.
Figure 2:
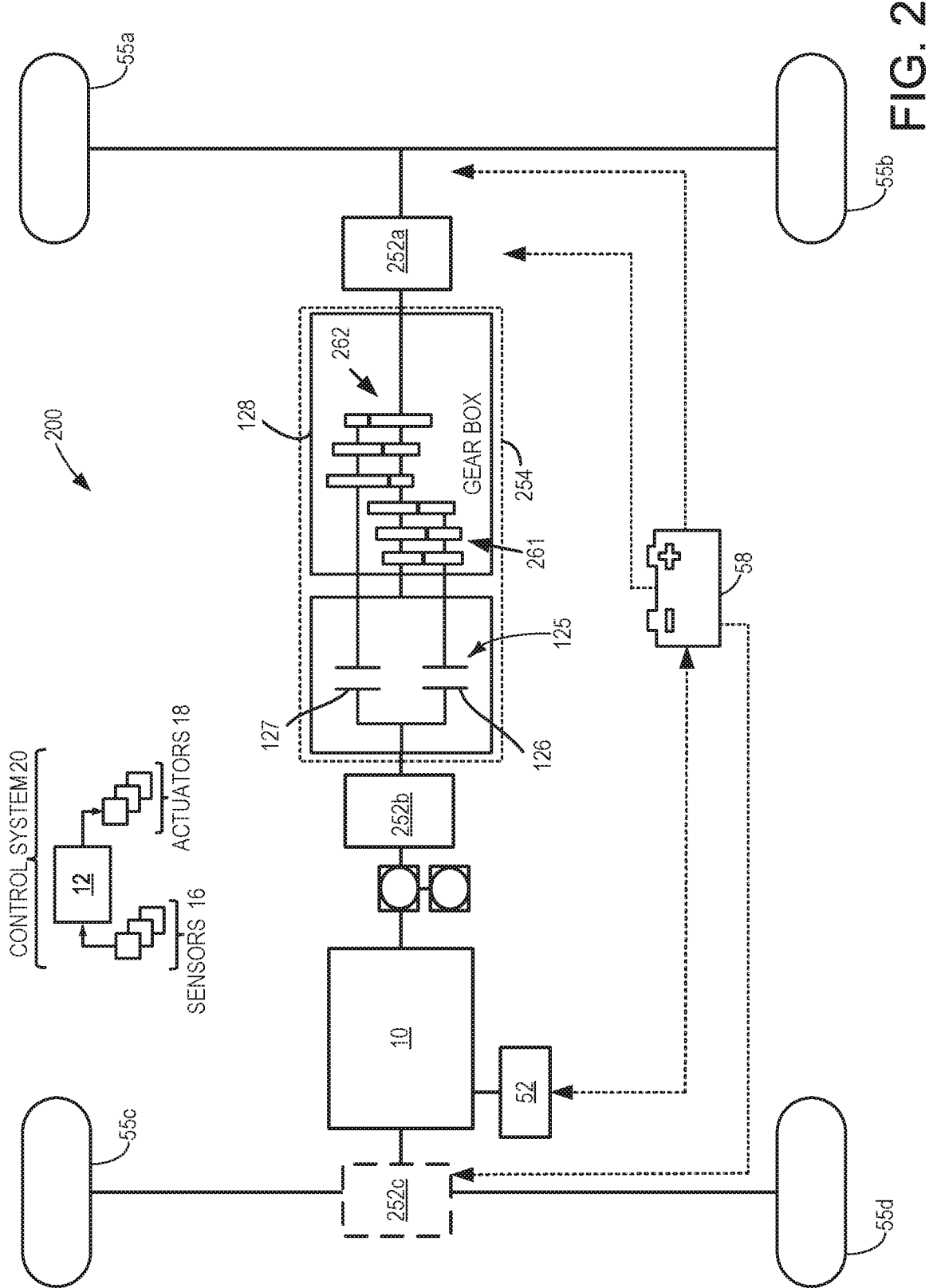
FIG. 2 shows a schematic diagram of a hybrid electric vehicle powertrain, according to one or more examples.

The following description relates to systems and methods for generating a base torque reserve based on an accelerator pedal position and a pedal rate of change. FIGS. 1 and 2 show an example hybrid vehicle diagram and an example hybrid vehicle powertrain generating the base torque reserve, according to at least one example. FIGS. 1 and 2 further show example base torque actuators such as an engine throttle, turbocharger, and waste gate valve, that may be adjusted to satisfy shaped base torque commands and the generate base torque reserves. Additionally, FIGS. 1 and 2 illustrate example instantaneous torque actuators including powertrain motors and spark plugs, which may be used to satisfy shaped instantaneous torque commands.

Figure 3:
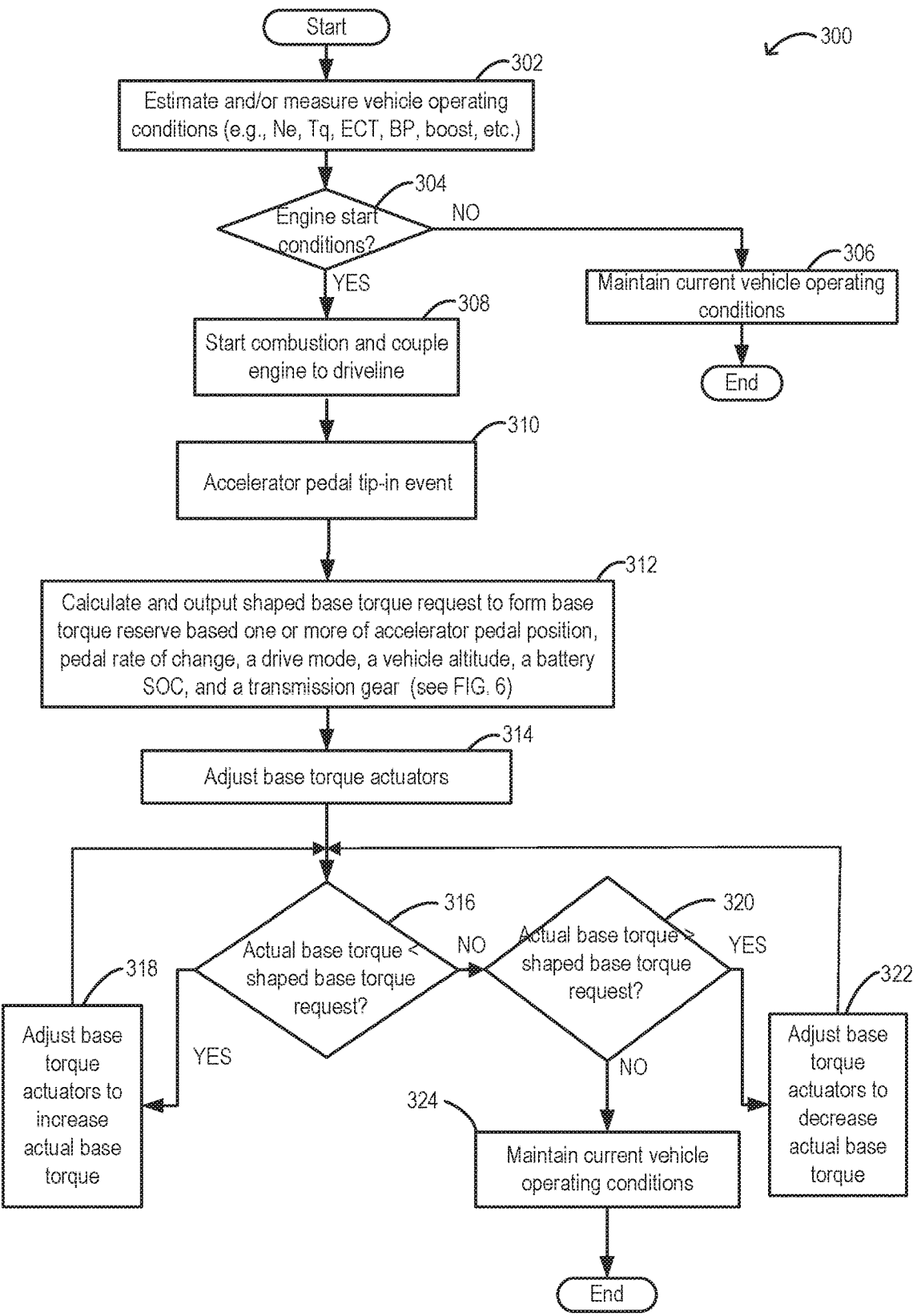
FIG. 3 shows a flow chart for a first method of operating a powertrain, according to one or more examples.
Figure 4:
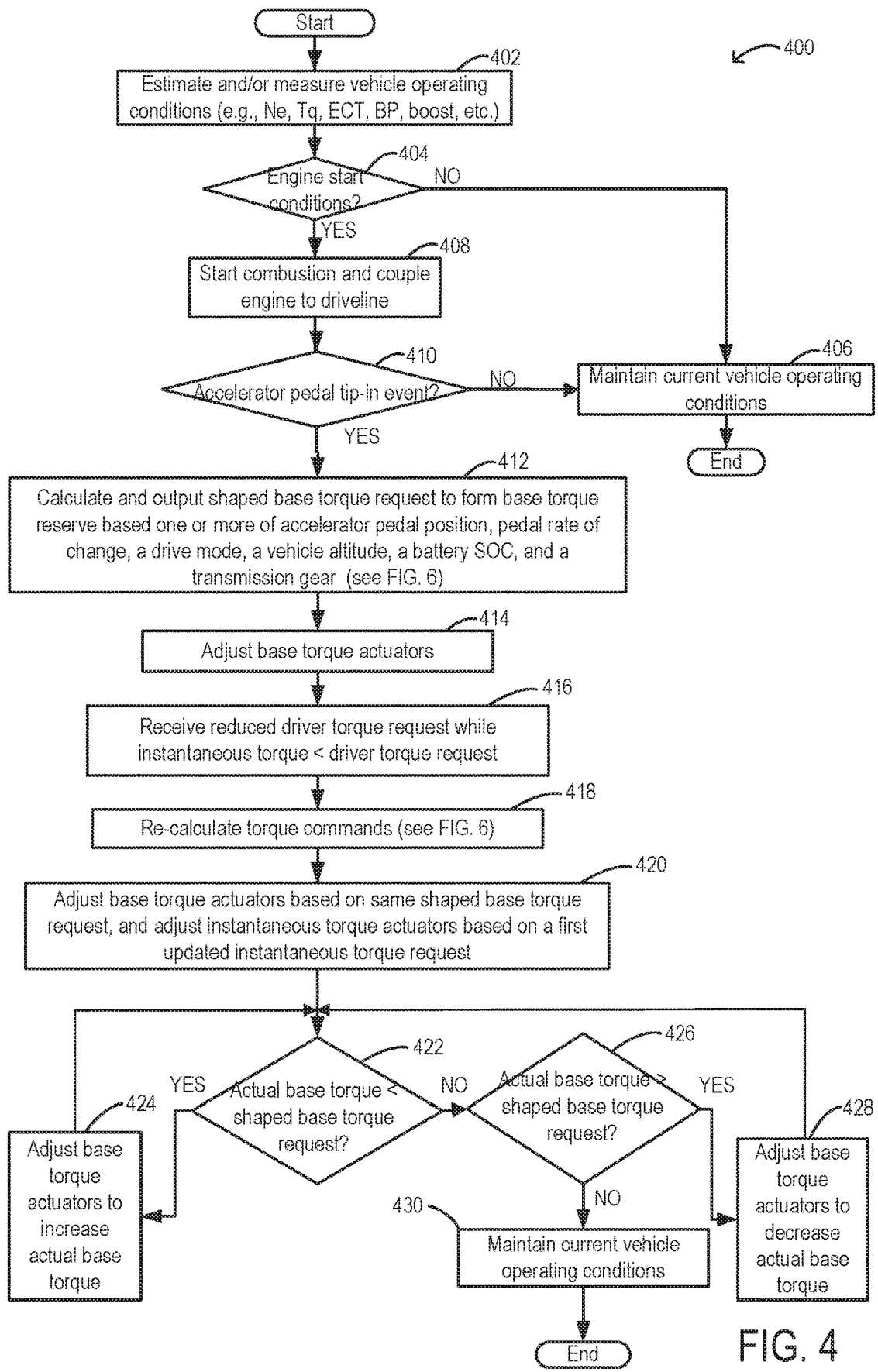
FIG. 4 shows a flow chart for a second method of operating a powertrain during a change of mind scenario, according to one or more examples.
Figure 5:
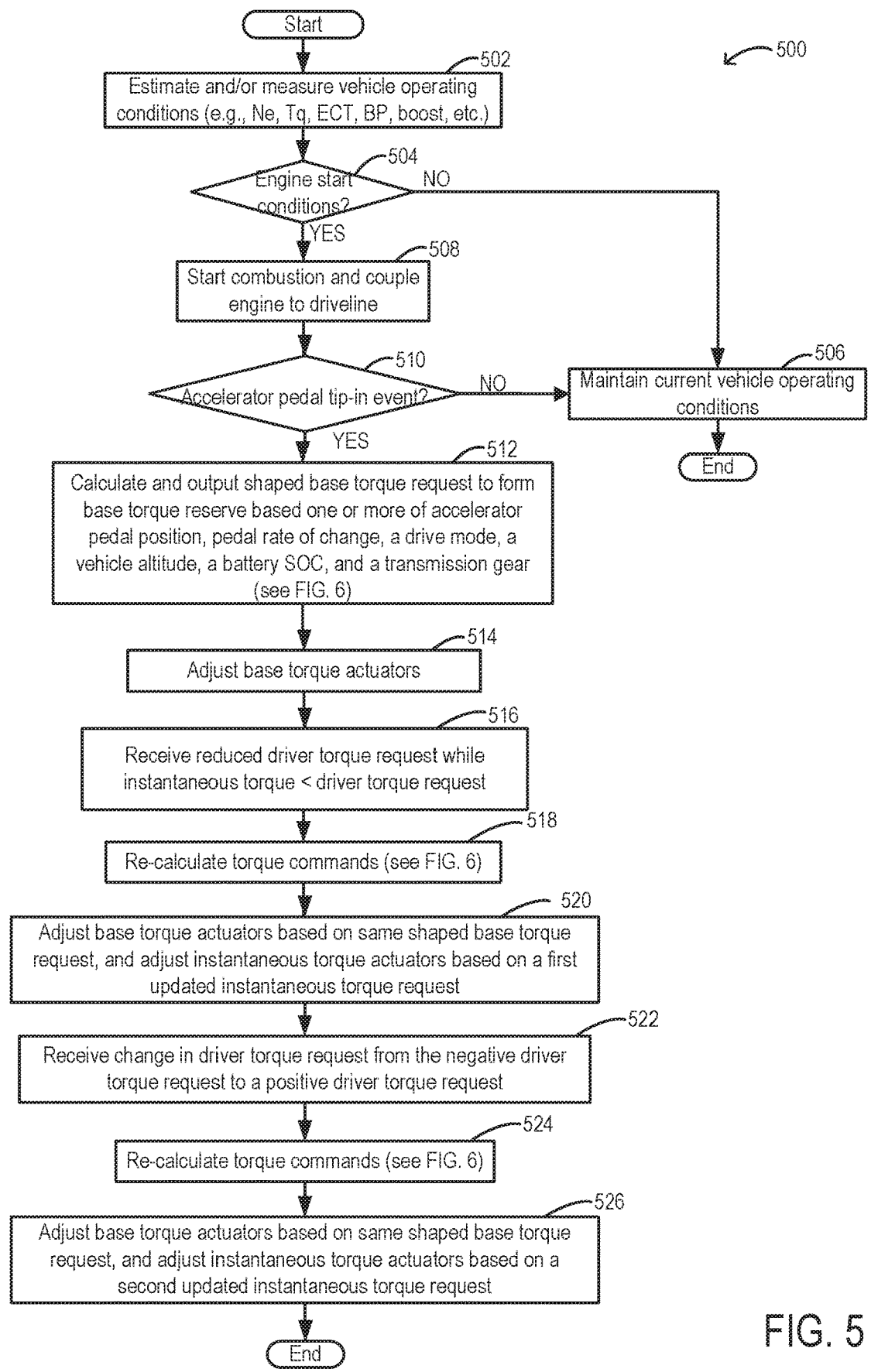
FIG. 5 shows a flow chart for a third method of operating a powertrain during a lash crossing scenario, according to one or more examples.

FIGS. 3, 4, and 5 describe various example driver torque request scenarios and adjustments made to base the torque actuators and to the instantaneous torque actuators to generate a base torque reserve that takes into account an accelerator pedal position and a pedal rate of change. Further, in one or more examples, the base torque reserve may additionally or alternatively be based on other factors. Such other factors may include one or more of a drive mode, a vehicle altitude, a battery state of charge (SOC), and a transmission gear. The drive mode may be a driver-selected drive mode. Additionally or alternatively, the drive mode may be an inferred drive mode. In examples where the drive mode is an inferred drive mode, the inferred drive mode may be determined based on detected driver behavior, as elaborated in greater detail below. Moreover, the drive mode disclosed herein may be selected from a plurality of drive modes. For example, the plurality of drive modes may include a sport mode and an economy mode, in at least one example. Additional drive modes may further be included among the plurality of drive modes for selection without departing from the scope of the present disclosure. For example, such additional optional drive modes may include one or more of an autonomous drive mode, a manual drive mode, a city drive mode, a cruise control drive mode, and an off-roading drive mode, for example. Moreover, during tip-in scenarios at lower gears, when the torque converter is either open or slipping, the driver torque request may be changed rapidly in order to spin up the engine and deliver propulsion to the wheels. Thus, in such scenarios, the base torque reserve has to be increased in order to deliver this aggressive increase in torque demand. FIGS. 3, 4, and 5 may be carried out in conjunction with the example calculations shown in FIG. 6 for calculating a shaped base torque command. Moreover, FIG. 7 shows a prophetic timeline to visually represent various parameters for generating the base torque reserve based on the accelerator pedal position and the pedal rate of change. Further factors, such as one or more of a drive mode, a vehicle altitude, a battery SOC, and a transmission gear may additionally be taken into account. FIG. 7 further provides an example of various driver torque request scenarios, such as those shown in FIGS. 3, 4, and 5, where the parameters shown in FIG. 7 are also controlled based on calculations such as those shown at FIG. 6. In at least one example, the prophetic timeline shown at FIG. 7 may be carried out in an HEV including one or more features illustrated in FIGS. 1 and 2. Further, for purposes of discussion, it is noted that the figures may be described collectively. Thus, elements that are substantially the same may be assigned the same reference numeral and may not be reintroduced.

Turning now to FIG. 1, an example of a combustion chamber or cylinder of internal combustion engine 10 is depicted. Engine 10 may be controlled at least partially by a control system including controller 12 and by input from a vehicle operator 130 via an input device 132. In this example, input device 132 includes an accelerator pedal and a pedal position sensor 134 for generating a proportional pedal position signal PP. The position sensor 134 of the input device 132 may be used to determine a rate of change of the input device 132 during a tip-in event, where a tip-in event is an adjustment to a position of the input device 132 to request an increase in vehicle speed. That is, the rate of change of the input device 132 (such as an accelerator pedal) during the tip-in event may be calculated based on output from the pedal position sensor 134 to controller 12. Further factors, such as one or more of a drive mode, a vehicle altitude, a battery SOC, and a transmission gear may additionally be taken into account. Cylinder (herein also "combustion chamber") 14 of engine 10 may include combustion chamber walls 136 with piston 138 positioned therein. The cylinder 14 is capped by cylinder head 157. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 can communicate with other cylinders of engine 10 in addition to cylinder 14. In some examples, one or more of the intake passages may include a boosting device such as a turbocharger or a supercharger. For example, FIG. 1 shows engine 10 configured with a turbocharger including a compressor 174 arranged between intake passages 142 and 144, and an exhaust turbine 176 arranged along exhaust passage 148. Compressor 174 may be at least partially powered by exhaust turbine 176 via a shaft 180 where the boosting device is configured as a turbocharger.

However, in other examples, such as where engine 10 is provided with a supercharger, exhaust turbine 176 may be optionally omitted or included in addition to the supercharger, where compressor 174 may be powered by mechanical input from a motor or the engine. In at least one example, operation of the turbocharger may be adjusted responsive to an amount of base torque desired from an internal combustion engine.

For example, one or more of a waste gate valve 163 and a supercharger may be adjusted via controller 12 to control a speed of the compressor 174. For example, a waste gate valve 163 position may be adjusted vary an amount of exhaust gases that bypass turbine 176 via bypass passage 181 and that pass through the turbine 176. Such control of the exhaust gas flow through the turbine 176 in turn controls the speed of compressor 174. Moreover, a position of fins of the turbine 176 may be adjusted to adjust the speed of compressor 174. By adjusting the speed of compressor 174, an amount of charge air provided to cylinders of the engine (e.g., cylinder 14) may be varied.

In at least one example, by increasing the speed of the compressor 162, an increased amount of charge air may be provided to cylinders of the engine. Such increased amount of air may enable increased base torque to be produced by the engine 10. It is noted that base torque is an amount of torque provided via adjustment of an air intake of the engine 10. Thus, base torque may also be referred to as air torque herein.

In another example, a speed of the compressor 162 may be decreased to provide a decreased amount of air charge to the cylinders of the engine. Such decreased amount of air charge may decrease an amount of base torque that can be provided via the engine 10.

Further, in one or more examples, the engine 10 may include a charge air cooler 177 (CAC), which may also be used to adjust an amount of air charge flowed into the cylinders of the engine. As air is compressed via compressor 174, the compressor 174 may actually cause the air to increase in temperature and expand. Thus, should the compressor 174 cause a temperature of the air to increase too much, an amount of air that can ultimately be flowed into cylinders of the engine for combustion purposes may become limited. Therefore, the CAC 177 may be operated to cool air that has been compressed via compressor 174 and mitigate issues of a limited air flow into cylinders such as cylinder 14. Alternatively, the CAC 177 may further not be operated during conditions in which less air flow to cylinders of the engine is determined to be acceptable. Air filter 43 cleans air entering engine air intake 42.

A throttle 162 including a throttle plate 164 may be provided along an intake passage of the engine for varying the flow rate and/or pressure of intake air provided to the engine cylinders. For example, throttle 162 may be positioned downstream of compressor 174 as shown in FIG. 1, or alternatively may be provided upstream of compressor 174. The throttle 162 may be varied in position to adjust an amount of base torque provided by way of the engine 10. For example, during a condition where an increased amount of base torque is desired from the engine 10, throttle 162 may be adjusted to a more open position in order to increase an amount of air intake into one or more cylinders of the engine, such as cylinder 14. Further, in at least one example where a decreased amount of base torque is desired from the engine 10, throttle 162 may be adjusted to a more closed position in order to increase an amount of air intake into one or more cylinders of the engine.

Exhaust passage 148 can receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

Each cylinder of engine 10 includes one or more intake valves and one or more exhaust valves. For example, cylinder 14 is shown including at least one intake poppet valve 150 and at least one exhaust poppet valve 156 located at an upper region of cylinder 14. In some examples, each cylinder of engine 10, including cylinder 14, may include at least two intake poppet valves and at least two exhaust poppet valves located at an upper region of the cylinder.

In the example of FIG. 1, intake valve 150 and exhaust valve 156 are actuated (e.g., opened and closed) via respective cam actuation systems 153 and 154. Cam actuation systems 153 and 154 each include one or more cams mounted on one or more camshafts and may utilize one or more of cam profile switching (CPS), variable cam timing (VCT), variable valve timing (VVT) and/or variable valve lift (VVL) systems that may be operated by controller 12 to vary valve operation.

The angular position of intake and exhaust camshafts may be determined by position sensors 173 and 175, respectively. In alternate embodiments, one or more additional intake valves and/or exhaust valves of cylinder 14 may be controlled via electric valve actuation. For example, cylinder 14 may include one or more additional intake valves controlled via electric valve actuation and one or more additional exhaust valves controlled via electric valve actuation.

Cylinder 14 can have a compression ratio, which is the ratio of volumes when piston 138 is at bottom center to top center. In one example, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some examples, each cylinder of engine 10 may include a spark plug 192 housed within cylinder head 157 for initiating combustion. Ignition system 190 can provide an ignition spark to combustion chamber 14 via spark plug 192 in response to spark advance signal SA from controller 12, under select operating modes. However, in some embodiments, spark plug 192 may be omitted, such as where engine 10 may initiate combustion by auto-ignition or by injection of fuel as may be the case with some diesel engines.

In some examples, each cylinder of engine 10 may be configured with one or more fuel injectors for providing fuel thereto. As a non-limiting example, cylinder 14 is shown including two fuel injectors 166 and 170. Fuel injectors 166 and 170 may be configured to deliver fuel received from fuel system 8 which may include one or more fuel tanks, fuel pumps, and fuel rails. Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may improve mixing and combustion when operating the engine with an alcohol-based fuel due to the lower volatility of some alcohol-based fuels. Alternatively, the injector may be located overhead and near the intake valve to improve mixing. Fuel may be delivered to fuel injector 166 from a fuel tank of fuel system 8 via a high pressure fuel pump, and a fuel rail. Further, the fuel tank may have a pressure transducer providing a signal to controller 12.

Fuel injector 170 is shown arranged in intake passage 146, rather than in cylinder 14, in a configuration that provides what is known as port injection of fuel (hereafter referred to as "PFI") into the intake port upstream of cylinder 14. Fuel injector 170 may inject fuel, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

In an alternate example, each of fuel injectors 166 and 170 may be configured as direct fuel injectors for injecting fuel directly into cylinder 14. In still another example, each of fuel injectors 166 and 170 may be configured as port fuel injectors for injecting fuel upstream of intake valve 150. In yet other examples, cylinder 14 may include only a single fuel injector that is configured to receive different fuels from the fuel systems in varying relative amounts as a fuel mixture, and is further configured to inject this fuel mixture either directly into the cylinder as a direct fuel injector or upstream of the intake valves as a port fuel injector. As such, it should be appreciated that the fuel systems described herein should not be limited by the particular fuel injector configurations described herein by way of example.

Fuel may be delivered by both injectors to the cylinder during a single cycle of the cylinder. For example, each injector may deliver a portion of a total fuel injection that is combusted in cylinder 14. Further, the distribution and/or relative amount of fuel delivered from each injector may vary with operating conditions, such as engine load, knock, and exhaust temperature, such as described herein below. The port injected fuel may be delivered during an open intake valve event, closed intake valve event (e.g., substantially before the intake stroke), as well as during both open and closed intake valve operation. Similarly, directly injected fuel may be delivered during an intake stroke, as well as partly during a previous exhaust stroke, during the intake stroke, and partly during the compression stroke, for example. As such, even for a single combustion event, injected fuel may be injected at different timings from the port and direct injector. Furthermore, for a single combustion event, multiple injections of the delivered fuel may be performed per cycle. The multiple injections may be performed during the compression stroke, intake stroke, or any appropriate combination thereof.

Fuel injectors 166 and 170 may have different characteristics, such as differences in size. For example, one injector may have a larger injection hole than the other. Other differences include, but are not limited to, different spray angles, different operating temperatures, different targeting, different injection timing, different spray characteristics, different locations etc. Moreover, depending on the distribution ratio of injected fuel among injectors 170 and 166, different effects may be achieved.

In some examples, vehicle 5 may be a hybrid vehicle with multiple sources of torque available to one or more vehicle wheels 55. In other examples, vehicle 5 is a conventional vehicle with only an engine, or an electric vehicle with only electric machine(s). In the example shown, vehicle 5 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches are engaged. In the depicted example, a first clutch 56 is provided between crankshaft 140 and electric machine 52, and a second clutch 97 is provided between electric machine 52 and transmission 54. Controller 12 may send a signal to an actuator of each clutch (e.g., first clutch 56 and/or second clutch 97) to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle. As illustrated in FIG. 1, one or more of the first clutch 56, electric machine 52, and transmission 54, and vehicle wheels 55 may be communicatively coupled to controller 12 via electronic communication. In at least one example, controller 12 may comprise instructions stored in non-transitory memory to actuate actuators associated with one or more of the first clutch 56, electric machine 52, transmission 54, and vehicle wheels 55.

Electric machine 52 receives electrical power from a traction battery 58 to provide torque to vehicle wheels 55. Electric machine 52 may also be operated as a generator to provide electrical power to charge battery 58, for example during a braking operation.

As described above, FIG. 1 shows only one cylinder of multi-cylinder engine 10. As such, each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The controller 12 receives signals from the various sensors of FIG. 1 and employs the various actuators of FIG. 1 to adjust engine operation based on the received signals and instructions stored on a memory of the controller. For example, adjusting a duration of time that an intake valve 150 is maintained in a lifted position, allowing intake air to flow into the cylinder 14, may include adjusting hydraulic pressures in actuators of the electro-hydraulic valve train 152 coupled to the intake valve 150 based on data received from the pedal position sensor 134 of the input device 132. Depression of the input device 132, when configured as an accelerator pedal, may indicate a request for boost and valve lift and lift timing may be adjusted accordingly. As detailed below, pedal position of the accelerator pedal and a pedal rate of change during accelerator pedal adjustments may further advantageously be used to shape a base torque of the engine. Further factors, such as one or more of a drive mode, a vehicle altitude, a battery SOC, and a transmission gear may additionally be taken into account.

Controller 12 is shown in FIG. 1 as a microcomputer, including microprocessor unit 106, input/output ports 108, an electronic storage medium for executable programs and calibration values shown as non-transitory read only memory chip 110 in this particular example for storing executable instructions, random access memory 112, keep alive memory 114, and a data bus. Controller 12 may receive various signals from sensors coupled to engine 10, in addition to those signals previously discussed, including measurement of inducted mass air flow (MAF) from mass air flow sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; and absolute manifold pressure signal (MAP) from sensor 124. Engine speed signal, RPM, may be generated by controller 12 from signal PIP. Manifold pressure signal MAP from a manifold pressure sensor may be used to provide an indication of vacuum, or pressure, in the intake manifold. Controller 12 may infer an engine temperature based on an engine coolant temperature.

In at least one example, controller 12 may receive PP signals indicating a pedal position of the input device 132, where the input device 132 may be an accelerator pedal. Such signals output to the controller 12 regarding the pedal position of the accelerator pedal may be used to control one or more actuators of the engine. In particular, controller 12 may calculate a shaped base torque for the engine based on the pedal position and the pedal rate of change of the accelerator pedal during a tip-in event. As detailed below, the shaped base torque of the engine may be used to establish a torque reserve by controlling one or more base actuators based on the shaped base torque.

Engine 10 may be controlled at least partially by a control system 20 including controller 12. Controller 12 may receive various signals from sensors 16 coupled to engine 10, and send control signals to various actuators 18 coupled to the engine and/or vehicle. The various sensors may include, for example, various temperature, pressure, torque, and air-fuel ratio sensors. The various actuators may include, for example, various valves, throttles, and fuel injectors. Controller 12 may be a microcomputer, including a microprocessor unit, input/output ports, an electronic storage medium for executable programs and calibration values.

Controller 12 may be programmed with computer readable data representing instructions executable to perform the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

For example, adjusting a position of throttle 162 may include adjusting an actuator of throttle plate 164 to adjust the position of throttle 162. Similarly, adjusting a position of waste gate valve 163 may include adjusting an actuator of the waste gate valve 163 to adjust the position of the waste gate valve 163. Further, adjusting a torque output of a motor, such as motor 52, may include adjusting an actuator of the motor by way of an amount of current supplied to the motor.

Turning now to FIG. 2, FIG. 2 is a block diagram of vehicle 5 including a powertrain 200. The powertrain of FIG. 2 includes engine 10 shown in FIG. 1. Other components of FIG. 2 that are common with FIG. 1 are indicated by like numerals. Powertrain 200 is shown including vehicle control system 20, including system controller 12, sensors 16, and actuators 18. It is noted that the arrangement as shown in FIG. 2 is exemplary and that other motor arrangements for the powertrain are also contemplated without departing from the scope of the disclosure.

Controller 12, sensors 16, and actuators 18 may be coordinated in the vehicle control system 20 to provide information such as torque output limits (e.g. torque output of the device or component being controlled not to be exceeded), torque input limits (e.g. torque input of the device or component being controlled not to be exceeded), torque output of the device being controlled, sensor an actuator data, and diagnostic information.

For example, in response to a driver releasing an accelerator pedal and vehicle speed decreasing, controller 12 may request a desired wheel torque or wheel power level to provide a desired rate of vehicle deceleration.

In this example, powertrain 200 may be powered by engine 10 and one or more of electric machines 252a, 252b, 252c (also referred to herein as motors). In at least one example, engine 10 may be started with electric machine 52 via a belt integrated starter/generator (BISG), where electric machine 52 may also be used to provide torque directly to a vehicle powertrain. It is also noted that electric machine 52 may crank the engine 10 through the disconnect clutch 56, in at least one example. In at least one example, a separate BISG motor may be used to crank the engine. In one or more examples, a low-voltage starter motor may be used to crank the engine 10.

Alternatively, engine 10 may be started with a separate starter motor which is not able to provide torque directly to the vehicle driveline. In some examples, BISG may be coupled directly to the engine crankshaft at either end (e.g., front or back) of the crankshaft. Electric machine 52 (e.g. high voltage electric machine, operated with greater than 30 volts), is also referred to herein as electric machine, motor, and/or generator. Further, torque of engine 10 may be adjusted via base torque (also referred to as air torque). Additionally or alternatively, the torque of engine 10 may be adjusted via instantaneous torque by adjusting ignition spark timing. However, a minimum amount of the base torque must be provided via engine 10 before making adjustments via instantaneous torque by way of ignition spark timing.

BISG may be mechanically coupled to engine 10 via a belt. BISG may be coupled to a crankshaft 40 or a camshaft. BISG may operate as a motor when supplied with electrical power via electric energy storage device 58, also referred to herein as onboard energy storage device 58. BISG may additionally operate as a generator supplying electrical power to electric energy storage device 58.

Powertrain 200 includes engine 10 mechanically coupled to dual clutch transmission (DCT) 125 via crank shaft 40. DCT 125 includes a first clutch 126, a second clutch 127, and a gear box 128. DCT 125 outputs torque to shaft 129, to supply torque to vehicle wheels 55a, 55b, 55c, 55d. Transmission controller 254 selectively opens and closes first clutch 126 and second clutch 127 to shift DCT 125. In some examples, there are no other powertrain clutches or disconnect devices other than those shown in FIG. 2. However, in other examples, additional clutches or disconnect devices may be added, if desired. As discussed above, selectively opening/closing first clutch 126 and/or second clutch 127 may comprise controlling an application pressure of a fluid to first clutch 126 and/or second clutch 127. In other words, first clutch 126 and second clutch 127 may be hydraulically actuated. Gear box 128 may include a plurality of gears. One clutch, for example first clutch 126 may control odd gears 261 (e.g. first, third, fifth, and reverse), while another clutch, for example second clutch 127, may control even gears 262 (e.g. second, fourth, and sixth). By utilizing such an arrangement, gears can be changed without interrupting power flow from the engine 10 to dual clutch transmission 125.

Electric machine 52 may be operated to provide torque to powertrain 200 or to convert powertrain torque into electrical energy to be stored in electrical energy storage device 58 in a regeneration mode. Additionally, electric machine 52 may convert the vehicle's kinetic energy into electrical energy for storage in electric energy storage device 58.

Electrical energy storage device 58 (e.g. high voltage battery or power source) may be a battery, capacitor, or inductor. Electric machine 120 is mechanically coupled to wheels 131 and dual clutch transmission via a gear set in rear drive unit 136 (shown in FIG. 1A). Electric machine 120 may provide a positive torque or a negative torque to powertrain 200 via operating as a motor or generator as instructed by electric machine controller 252.

Further, a frictional force may be applied to wheels 131 by engaging friction wheel brakes 218. In one example, friction wheel brakes 218 may be engaged in response to the driver pressing his foot on a brake pedal (e.g. 192) and/or in response to instructions within brake controller 141. Further, brake controller 141 may apply brakes 218 in response to information and/or requests made by vehicle system controller 12. In the same way, a frictional force may be reduced to wheels 131 by disengaging wheel brakes 218 in response to the driver releasing his foot from a brake pedal, brake controller instructions, and/or vehicle system controller instructions and/or information. For example, vehicle brakes may apply a frictional force to wheels 131 via controller 141 as part of an automated engine stopping procedure.

Transmission controller 254 and vehicle system controller 12, may receive transmission information from sensors 16, which may include but are not limited to pump output line pressure sensors, transmission hydraulic pressure sensors (e.g., gear clutch fluid pressure sensors), motor temperature sensors, BISG temperatures, shift selector position sensors, synchronizer position sensors, input and output shaft speed sensor(s), and ambient temperature sensors.

Positive torque may be transmitted to vehicle wheels 55 in a direction starting at engine 10 and ending at wheels 55. Thus, according to the direction of positive torque flow in powertrain 200, engine 10 is positioned in powertrain 200 upstream of transmission 125. Torque actuators positioned upstream of the transmission, including motors 52, 252*b*, 252*c*, as well as engine 10 are collectively referred to as upstream torque actuators. Any torque actuators positioned downstream of the transmission, such as motor 252*a*, are referred to as downstream torque actuators.

Turning to FIG. 3, FIG. 3 shows a method 300 for shaping a base torque of an engine, such as engine 10. As mentioned above, the base torque of the engine refers to an air path torque of the engine, in at least one example. Instructions for carrying out method 300 and the rest of the methods included herein may be executed by a controller, such as controller 12, based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

The method 300 includes adjusting a base torque of an engine based on an accelerator pedal position and an accelerator pedal position rate of change during a driver torque request, where adjusting the base torque generates a base torque reserve (also referred to as an engine air torque reserve). Similarly, it is noted that base torque may be referred to as air torque herein.

In at least one example, responsive to receiving an accelerator pedal position sensor output (e.g., PP in FIG. 1) at controller 12 as part of a driver torque request, an accelerator pedal position and an accelerator pedal position rate of change are calculated. Then, using the accelerator pedal position and the accelerator pedal position rate of change, a shaped base torque command is output to one or more base torque actuators. The base torque actuators are then adjusted responsive to receiving the shaped base torque command, generating a base torque reserve.

In this way, a base torque reserve may be formed based on an accelerator pedal position and a pedal rate of change of a driver torque request. In particular, the accelerator pedal position and the pedal rate of change are an indication of a desired responsiveness for the driver torque request. Thus, the technical effect of forming the base torque reserve based on the accelerator pedal position and the pedal rate of change is that a desired responsiveness of a torque request is taken into account during a tip-in event for coordinating torque actuator outputs.

By taking into account the desired responsiveness, the base torque reserve generated is large enough to ensure that an instantaneous torque command is delivered (e.g., a shaped instantaneous torque command) while avoiding a base torque reserve that is too large, which would lead to degraded fuel economy and NVH.

Turning now to step 302 of method 300, step 302 includes estimating and/or measuring vehicle operating conditions via one or more of the sensors and actuators described above in relation to FIGS. 1 and 2. It is noted that the engine, such as engine 10, is in an off state at step 302. The engine is in the off state when the engine is operated in a non-combustion mode, and the engine is in an on state if the engine is operated in a combustion mode.

Even though the engine is in the off state at step 302, it is noted that the vehicle may be in an on state. For example, the vehicle may be in the on state if one or more motors of the vehicle (e.g., motors 252*a*, 252*b*, 252*c*, 52) are operational, whether or not the engine is in an on state. For example, the vehicle may be an HEV that is propelled via on or more motors even though the engine is in the off-state. The vehicle is in the on state if at least one of the engine and one or more of the motors are in the on state.

Following step 302, method 300 comprises determining whether or not engine start conditions are satisfied at step 304. In at least one example, the engine may include one or more of the features discussed above in relation to engine 10.

Such engine start conditions may include an engine start request via a user input. For example, the user input requesting the engine start request may include one or more of receiving a user input to an engine start button of the vehicle and receiving a user input turning over an ignition of an engine (e.g., via key). Additionally or alternatively, the engine start conditions may include one or more of a driver torque request greater than a threshold torque and a battery state of charge being less than a threshold state of charge. That is, the engine start may be carried out responsive to a driver torque request that cannot be satisfied by the motors of the engine. Additionally or alternatively, the engine start may be carried out responsive to the battery state of charge being less than a threshold state of charge needed to satisfy the driver torque request via the motors of the vehicle alone.

Should the engine start conditions not be satisfied at step 304 ("NO"), method 300 may include maintaining current vehicle operating conditions at step 306 and then ending the method. Responsive to the engine start conditions being satisfied at step 304 ("YES"), method 300 may include starting combustion of the engine and coupling the engine to a vehicle driveline at step 308. It is noted that one or more motors providing instantaneous torque may be controlled to provide a negative torque just prior to coupling the engine to the vehicle driveline for purposes of managing a battery SOC effectively.

In particular, at step 308, the engine may be transitioned from the off state to the on state by initiating combustion of the engine. Engine combustion may be initiated by rotating the engine, directing air into one or more cylinders of the engine, injecting fuel into the one or more cylinders of the engine, and (in some examples) carrying out ignition sparks within the one or more cylinders of the engine. It is noted that in some examples the engine may comprise compression ignition cylinders instead, however. The engine may further be coupled to the vehicle driveline via a transmission at step 308 via a DCT. A coupling of the engine with the driveline via the DCT allows for a torque transfer from the engine to the driveline. In at least one example, the engine may be started, and then the engine may be coupled to the driveline after a target torque output by the engine has been reached. The target torque output of the engine for coupling the engine to the driveline may be a range, in at least one example. Alternatively, the engine may be coupled to the driveline via closing the clutch of the transmission prior to the engine being transitioned to the on state (prior to combustion operation).

After starting the engine combustion and coupling the engine to the driveline at step 308, step 310 of method 300 an accelerator pedal tip-in event occurs. The tip-in event is a positive driver torque request, in at least one example. The accelerator pedal tip-in event at step 310 includes a repositioning of an accelerator pedal of the vehicle (e.g., input device 132) from a first pedal position to a second pedal position via depression of the accelerator pedal. As discussed above, depression of the accelerator pedal may indicate an increased torque request. The first pedal position of the accelerator pedal may be a position at which a relatively lower driver torque request is requested compared the second pedal position of the accelerator pedal, at which a relatively higher driver torque request is requested.

Thus, the transition of the accelerator pedal from the first pedal position to the second pedal position during the tip-in event at step 310 indicates a request for an increase of torque from a driver (e.g., to increase a speed of the vehicle). In one or more examples, a pedal rate of change of the accelerator pedal during the tip-in event may be monitored at step 310. In at least one example, the pedal rate of change may be the rate of change of the pedal measured from the first pedal position to the second pedal position. The pedal rate of change may be used to determine a desired responsiveness to the tip-in event, and in turn the amount of base torque reserve to generate, in at least one example. The accelerator pedal position and the pedal rate of change may be based on a signal output, such as signal PP shown in FIG. 1.

A desired responsiveness to an increased torque request from a tip-in event may be determined to increase as a pedal rate of change increases, in one or more examples. Conversely, the desired responsiveness to an increased torque request from a tip-in event may be determined to decrease as a pedal rate of change decreases.

The desired responsiveness of an increased torque request may be used to coordinate control of various torque actuators of the vehicle driveline. In particular, the desired responsiveness for the increased torque request may be used to shape a base torque request for an engine, which is discussed in further detail below.

Following step 310 of method 300, method 300 includes calculating and outputting a shaped base torque request at step 312. The shaped base torque request calculations include calculations to account for a base torque reserve based on the accelerator pedal position and based on the pedal rate of change from the pedal tip-in event at step 310. Additionally or alternatively, the shaped base torque calculations may take into account one or more of a drive mode, a vehicle altitude, a battery SOC, and a transmission gear. Thus, the shaped base torque request may be output to at least one base torque actuator to form the base torque reserve. The shaped base torque request calculated and output at step 312 may be calculated via the approach discussed at FIG. 6, in at least one example.

Figure 6:
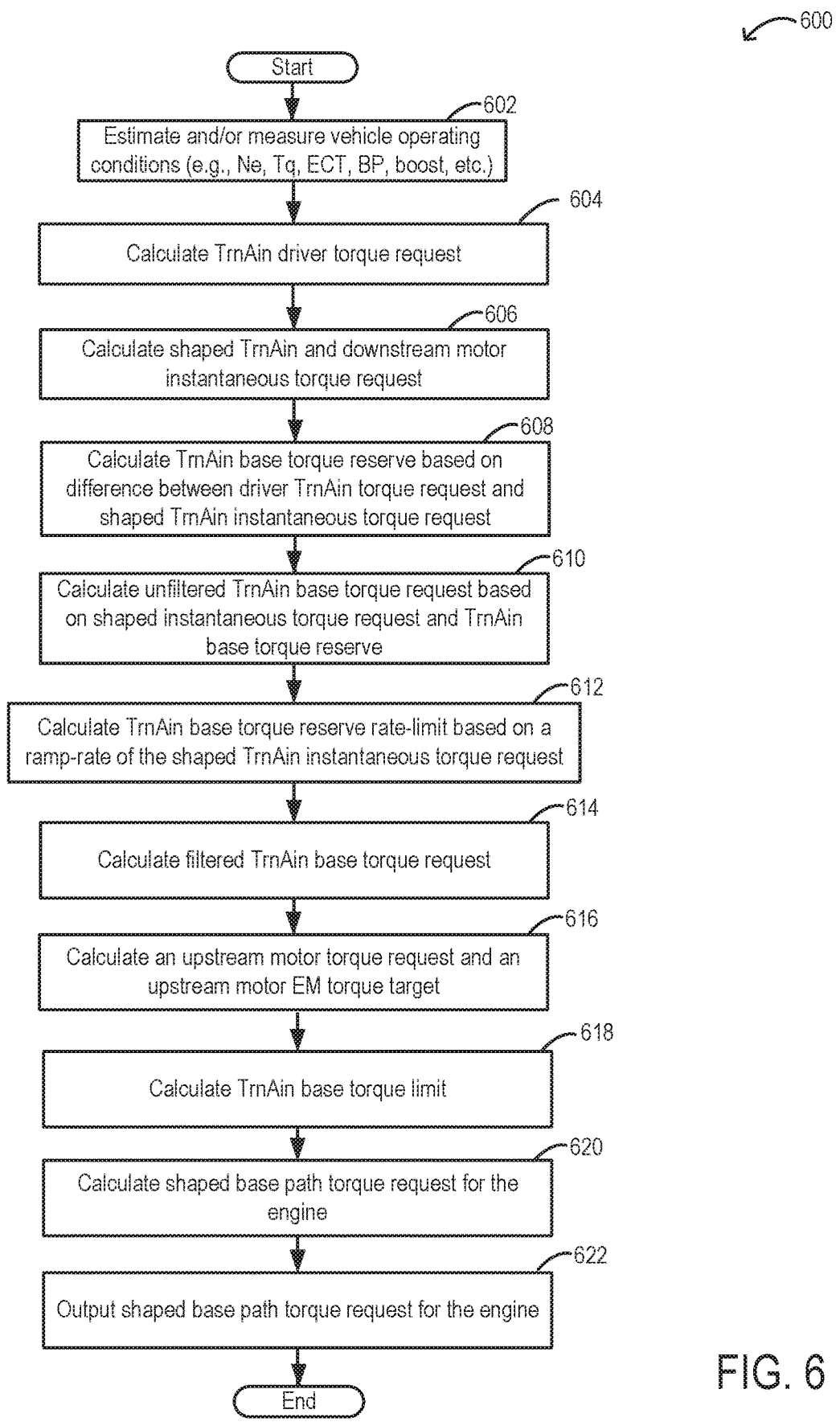
FIG. 6 shows a flow chart for calculating a shaped base torque command, according to one or more examples.
Figure 7:
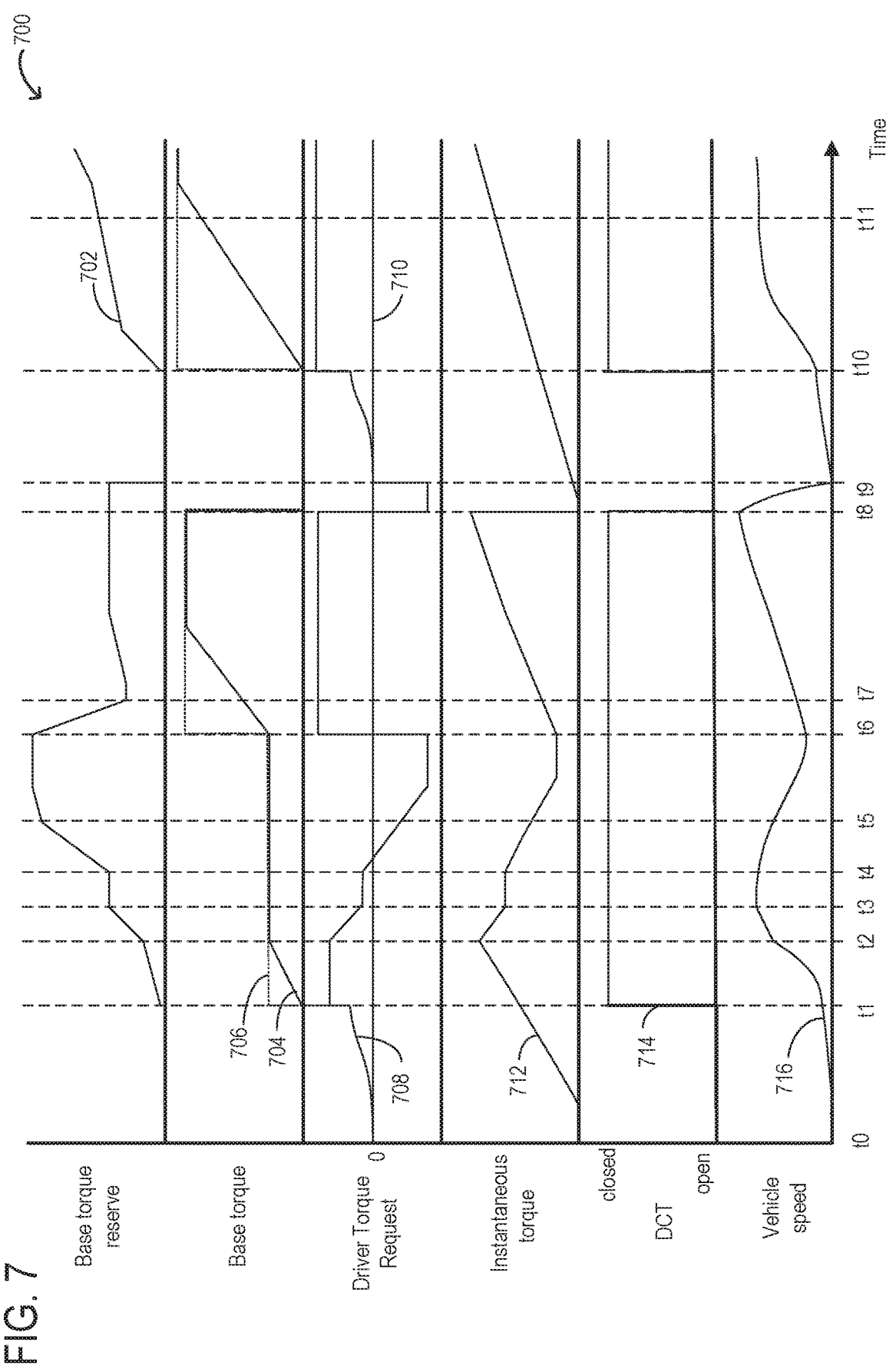
FIG. 7 shows a flow chart of an example prophetic timeline, according to one or more examples.

Turning briefly now to FIG. 6, FIG. 6 shows an example method 600 for calculating and outputting the shaped base torque request for an engine, such as engine 10. In at least one example, method 600 may be used to calculate and output the shaped base torque request for the engine at step 312 of method 300, step 412 of method 400, and at steps 506 and 512 of method 500.

The shaped base torque request for the engine is used to form a base torque reserve, in at least one example, where an amount of the base torque reserve formed is based on an accelerator pedal position and a pedal rate of change. A base torque request may be defined via the following Equation 1:

TrnAin base torque request=Engine base torque request+P1 motor torque request.

It is noted that actuators at the input (upstream) of the transmission, are referred to herein as TrnAin. It is further noted that the P1 motor torque request refers to a TrnAin motor request (such as a request for motor 252*b*).

Turning first to step 602 of method 600, step 602 includes estimating and/or measuring vehicle operating conditions. The estimations and/or measurements of the vehicle operating conditions may be based on one or more outputs of vehicle sensors to a controller, such as output from sensors 16 to controller 12 shown in FIGS. 1 and 2.

In cases where method 600 is used in conjunction with another method disclosed herein, such as methods 300, 400, and 500, the estimations and/or measurements at 602 may be updated from previous estimates and/or measurements. For example, the estimates and/or measurements at 602 in method 600 may be updated (that is, more current) compared to the estimates and/or measurements at step 302 of method 300. As to method 400, the estimates and/or measurements at 602 for the step 412 calculation may be more updated than the estimates and/or measurements from step 402. Further, the estimates and/or measurements at 602 may be more updated during the re-calculation step at 418 of method 400 than the estimates and/or measurements at both steps 402 and 412 of method 400. With regards to method 500, the estimates and/or measurements at 506 may be more current than the estimates and/or measurements at step 502 of method 500. Moreover, the estimates and/or measurements at 602 may be more updated during re-calculation at step 512 of method 500 than the estimates and/or measurements at both steps 502 and 506 of method 500. Such vehicle operating conditions estimated and/or measured at 602 may include one or more of a torque output of one or more motors, engine rotational speed, vehicle speed, engine torque output, air charge amount, spark timing, a current accelerator pedal position, air intake temperature, and an estimated pedal rate of change for adjusting the accelerator pedal into the current accelerator pedal position, for example.

Once the vehicle operating conditions have been estimated and/or measured at step 602, method 600 includes calculating a driver torque request for actuators at the input (upstream) of the transmission, which are referred to herein as TrnAin, at step 604. In at least one example, the driver torque request at step 604 refers to a driver torque request for the wheels of the vehicle. That is, the driver torque request at step 604 is a driver torque request to affect a change in speed of the vehicle via the wheels.

The driver torque request may be determined based on an accelerator pedal position, in at least one example. Additionally, the driver torque request may further be determined based on a pedal rate of change of the accelerator pedal.

Further, calculating the driver torque request at step 604 may include calculating a desired distribution of the driver torque request between the TrnAin and any additional motor(s) positioned downstream of the transmission.

The TrnAin may include engine 10, and one or more of motor 52, motor 252*b*, and motor 252*c*, as illustrated in FIG. 2. In at least one example, the TrnAin (including engine 10, motor 52, motor 252*b*, and motor 252*c*) may also be referred to as upstream torque actuators herein. The additional motor(s) positioned downstream of the transmission (such as motor 252*a*) may be referred to herein as downstream torque actuator(s).

The desired distribution of the driver torque request between the TrnAin and at least one motor positioned downstream of the transmission may be based on individual compliance and lash characteristics of each of the TrnAin and at least one motor, in at least one example.

Following calculation of the TrnAin driver torque request at step 604, method 600 includes calculating the shaped TrnAin and downstream motor instantaneous torque request at step 606. The shaped instantaneous torque request may also be referred to as a shaped TrnAin instantaneous torque request herein. The shaped instantaneous torque request may include the spark timing of the engine (such as engine 10) as well as the torque output for each of the motors (including one or more of motors 52, 252*a*, 252*b*, and 252*c*). The shaped instantaneous torque request may take into account an accelerator pedal position and a pedal rate of change, in at least one example.

Following step 606, method 600 includes calculating a TrnAin base torque reserve at step 608. In at least one example, the TrnAin base torque reserve is based on a difference between a driver TrnAin torque request and the shaped TrnAin instantaneous torque request. In at least one example, the TrnAin base torque reserve may be calculated in accordance with Equation 2, wherein Equation 2 is as follows:

$$\text{TrnAin base torque reserve} = f_1(\text{Driver TrnAin torque request} - \text{Shaped TrnAin instantaneous torque request})$$

In such examples, $f_1$ may be a calibratable function that is monotonic with respect to the difference (Driver TrnAin torque request–Shaped TrnAin instantaneous torque request). For example, $f_1$ may be calibrated such that, as the difference (Driver TrnAin torque request–Shaped TrnAin instantaneous torque request) increases, the TrnAin base torque reserve increases; and as the difference (Driver TrnAin torque request–Shaped TrnAin instantaneous torque request) decreases, the TrnAin base torque reserve decreases. The Shaped TrnAin instantaneous torque request may be based on an accelerator pedal position and pedal rate of change, in at least one example.

Via such an approach, the base torque reserve is advantageously large responsive to a fast accelerator pedal tip-in event and is small responsive to a slow accelerator pedal tip-in event. It is noted that a desired responsiveness to a tip-in event of the accelerator pedal increases in proportion to a pedal rate of change. For example, as discussed above, a desired responsiveness to a tip-in event of the accelerator pedal is considered to increase as the pedal rate of change increases. A slow accelerator pedal tip-in is thus a tip-in event with a relatively low pedal rate of change and a low desired responsiveness.

Put another way, via the approach disclosed herein, as the desired responsiveness increases, the base torque reserve generated is increased. As discussed above, the base torque of the engine may be slower compared to other torque outputs of the vehicle due to slow air dynamics. Further, an amount of base torque provided by the engine (via air charge) limits the amount of instantaneous torque (via spark ignition timing) that may be provided by the engine.

Thus, if the base torque reserve is too small, then a shaped instantaneous torque request may not be delivered. As such, in response to increased responsiveness expectations that are indicated by the pedal rate of change, the base torque reserve is increased to ensure sufficient air is available for other combustion parameters that may be adjusted (such as spark timing and/or fuel injection timing).

In at least one example, the TrnAin base torque reserve may take into account an altitude of the vehicle. Such altitude of the vehicle may be detected via a global positioning system (GPS) that may be integrated into the controller of the vehicle or otherwise communicatively coupled with the controller of the vehicle. Additionally or alternatively, one or more sensors of the vehicle may be used to infer an altitude of the vehicle. For example, one or more atmospheric pressure sensors of the vehicle may be used to calculate the altitude of the vehicle. One or more oxygen sensors may additionally or alternatively be used to calculate the altitude of the vehicle. Such oxygen sensors may be ambient oxygen sensors, in at least one example.

When the vehicle is operated at higher altitudes, the engine control system will reduce the amount of fuel injected into the engine in order to compensate for the lower density of air (e.g., lambda control). In this scenario, the base torque reserve can either be increased, to maintain performance, or this reserve can be maintained at the same level, which degrades performance.

Further, in one or more examples, the TrnAin base torque reserve may take into account a transmission gear of the vehicle. For example, during tip-in scenarios at lower gears, when the torque converter is either open or slipping, the driver torque request changes rapidly in order to spin up the engine and deliver propulsion to the wheels. Thus the base torque reserve has to be increased in order to deliver this aggressive increase in torque demand during such scenarios.

Additionally, conditions in which the base torque reserve is too large lead to NVH, as torque commands for various motors must be reduced to compensate for the excessive base torque reserve. In particular, coordinating the reduction of the various motors frequently induces clunk and shuffle issues in the powertrain. Such NVH may include clunk and/or shuffle issues. For example, clunk may manifest as audible noise in a frequency range of 1 Hz to 15 Hz, and shuffle may manifest a longitudinal vehicle jerking in a frequency range of 1 Hz to 15 Hz.

Thus, by adjusting the base torque reserve to decrease as the pedal rate of change decreases, advantages as to avoiding fuel inefficiencies and NVH are also avoided.

Following step 608, method 600 includes calculating an unfiltered TrnAin base torque request at step 610. The unfiltered TrnAin base torque request may be based on the shaped TrnAin instantaneous torque request calculated at step 606 and the TrnAin base torque reserve calculated at step 608. The unfiltered TrnAin base torque request advantageously increases a base torque reserve in a manner that is coordinated with an accelerator pedal position and pedal rate of change.

For example, the unfiltered TrnAin base torque request may be based on the shaped TrnAin instantaneous torque request added to the TrnAin base torque reserve. By adding the TrnAin base torque request to the shaped TrnAin instantaneous torque request, the unfiltered TrnAin base torque request exhibits a step increase at a start of a step increase in driver request. Such an increase is equal to a desired base torque reserve. Thus, as driver torque requests change, the unfiltered TrnAin base torque request helps to ensure that the shaped base torque request that is ultimately output forms a desired base torque reserve.

In at least one example, the unfiltered Trn base torque request may be calculated according to an equation such as Equation 3, where Equation 3 may be the following:

$$\text{Unfiltered TrnAin base torque request} = \text{Shaped TrnAin instantaneous torque request} + \text{TrnAin base torque reserve}$$

After calculating the unfiltered TrnAin base torque request at step 610, method 600 may include calculating a TrnAin base torque reserve rate-limit at step 612. In at least one example, the Trn base torque request of step 610 may be used to compute a filtered TrnAin base torque request. The TrnAin base torque request may be calculated via an equation such as Equation 4, where Equation 4 may be the following:

$$\text{Filtered TrnAin base torque request} = \text{Shaped TrnAin instantaneous torque request} + \text{Rate-Limit (TrnAin base torque reserve, TrnAin base torque reserve rate limit)}$$

In at least one example, the TrnAin base torque reserve rate limit may be based on a ramp-rate, or a slew-rate, of the shaped TrnAin instantaneous torque request. In some examples, the TrnAin base torque reserve rate-limit may be calculated via an equation such as Equation 5, where Equation 5 may be the following:

TrnAin base torque reserve rate-limit=$f_2$(Ramp-rate of shaped TrnAin instantaneous torque request)

In such examples, $f_2$ may be a calibratable and a monotonically increasing function. Further, in addition to the ramp-rate of the shaped TrnAin instantaneous torque request, the above TrnAin base torque reserve rate-limit also advantageously may take into account a ramp-rate of a downstream motor torque request, where the downstream motor torque request may be a torque request of a motor downstream of the transmission, such as motor 252a. For example, the ramp-rate of the shaped TrnAin instantaneous torque request takes into account the ramp-rate of a downstream motor torque request. Thus, by calculating the TrnAin base torque reserve rate-limit at least in part on the ramp-rate of the shaped TrnAin instantaneous torque request, the ramp-rate of a downstream motor torque request is beneficially incorporated.

In at least one example, the TrnAin base torque reserve rate-limit may be large when the ramp-rate of the shaped TrnAin instantaneous torque request is large (e.g., when the vehicle is operated in a performance mode). The TrnAin base torque reserve rate-limit may further be small when the ramp-rate of the shaped TrnAin instantaneous torque request is small (e.g., when the vehicle is operated in an economy mode). Such manipulation of the TrnAin base torque reserve rate-limit relative to the TrnAin instantaneous torque request may be carried out via calibration of $f_2$, in at least one example.

Following calculation of the TrnAin base torque reserve rate-limit at step 612, method may include calculating a filtered TrnAin base torque request at step 614. The TrnAin base torque request may be filtered based on the shaped TrnAin instantaneous torque request and a rate-limit, where the rate-limit is a rate-limit of an engine (such as engine 10). The rate of change of the filtered TrnAin base torque request may be limited to non-negative values.

By limiting the rate of change of the filtered TrnAin base torque request to be limited to non-negative values, step 614 of method 600 ensures the shaped base torque command ultimately output is monotonically increasing in the time interval during which the engine is delivering the propulsive torque requested.

Such features are particularly advantageous in a case where a negative driver torque request may be received while base torque actuator adjustments are still being made to satisfy a shaped base torque request for a positive driver torque request. In such cases, the shaped base torque request may be kept the same by way of limiting the rate of change of the TrnAin base torque request to non-negative values at step 614 of method 600. Thus, for example, if a driver negative torque command is received while base torque actuators are still being adjusted to increase a base torque, the base torque adjusters may continue to be adjusted based on the same shaped base torque request. Further, if a driver torque command changes from a negative torque command to a positive torque command, the shaped base torque command further stays then same.

The result is that, when crossing from positive to negative driver torque commands; or when crossing from negative to positive driver torque commands, the rate of change of the shaped base torque command stays the same and the shaped instantaneous torque command is adjusted to meet such changes in torque commands. Such an approach may help to avoid making adjustments that deplete a base torque reserve too quickly or that increase the base torque reserve too quickly.

Moreover, NVH issues may be avoided and driver changes in torque request may be quickly met. It is noted that for at least this reason, maintenance of a base torque reserve in accordance with the present disclosure may be particularly advantageous, as this base torque reserve enables adjustments to meet the shaped instantaneous torque commands in these scenarios.

Continuing, in one or more examples, the rate-limit may be based on a TrnAin base torque reserve and a TrnAin base torque reserve rate-limit. In at least one example, the TrnAin base torque request may be mathematically filtered via Equation 4, where Equation 4 may be the following:

Filtered TrnAin base torque request=Shaped TrnAin instantaneous torque request+Rate-Limit(TrnAin base torque reserve,TrnAin base torque reserve rate-limit)

Following calculation of the filtered TrnAin base torque request at step 614, method 600 includes calculating an upstream motor torque request and an upstream motor energy management (EM) torque target at step 616. The filtered TrnAin base torque request may advantageously be used in combination with an operational mode of the vehicle (e.g., performance mode or economy mode) to determine the upstream motor torque request and the upstream motor EM. It is noted that the operational mode of the vehicle is also referred to as the drive mode herein.

The drive mode may be manually selected based on receipt of a user input or may be inferred based on detected driving behavior. For example, the drive mode may be inferred by observing the trajectories of the pedal position, pedal rate, and vehicle speed over a period of time. The vehicle control system can then automatically switch over from a first drive mode (such as an economy mode) to a second drive mode (such as a performance mode), which would then result in an adjusted base torque reserve.

Moreover, the battery SOC may additionally or alternatively used to determine the upstream motor torque request and the upstream motor EM. For example, when the battery SOC is low, the energy management system may forces steady-state torque commands of the motors to be negative numbers of relatively large magnitudes to facilitate charging. Thus, the engine has to deliver the driver torque request, and, at the same time, provide additional torque to compensate for the negative torques of the motors. This scenario necessitates the inclusion of a larger base torque reserve, without which performance of the vehicle will be affected.

For example, via the filtered TrnAin base torque request, the shaped TrnAin instantaneous torque request may be allocated between an upstream transmission motor and an engine. For example, the filtered TrnAin base torque request may allocate the shaped instantaneous torque request between motor 252b and engine 10.

During a first condition, a vehicle may be operated in a performance mode and a rate of change of the filtered TrnAin base request is larger than a capability of the engine (e.g., engine 10). Responsive to the first condition, a portion of the shaped TrnAin instantaneous torque request is allocated to an upstream transmission motor (e.g., motor 252b) as an upstream motor EM torque target.

During a second condition, the vehicle may be operated in the performance mode and the rate of change of the filtered TrnAin base torque request is within the capability of the engine. Responsive to the second condition, most of the shaped TrnAin instantaneous torque request is allocated to the engine (e.g., engine 10), and the upstream motor EM torque target is relatively smaller than in the first condition. It is noted that the performance mode may also be referred to as a first operating mode herein.

Further, in one or more examples, if the vehicle is being operated in an economy mode and a rate of change of the filtered TrnAin base torque request is small, most of the TrnAin instantaneous torque request is allocated to the upstream transmission motor (e.g., 252b). It is noted that the economy mode may also be referred to as a second operating mode herein.

That is, a first portion of the TrnAin instantaneous torque request is allocated to the engine responsive to the rate of change of the filtered TrnAin base torque request being within the capability of the engine. A second portion of the TrnAin instantaneous torque, which is different than and greater than the first portion, is allocated to the engine when the rate of change of the filtered TrnAin base torque request is within the capability of the engine.

After calculating the upstream motor torque request and the upstream motor EM torque target at step 616, method 600 includes calculating the TrnAin base torque limit at 618. The TrnAin base torque limit may be based on the driver TrnAin torque request, the upstream motor torque request, and the upstream motor EM torque target, in at least one example. In one or more examples, the TrnAin base torque limit maybe calculated via an equation, such as Equation 6. Equation 6 may be as follows:

Trn base torque limit=Driver TrnAin torque request+
Upstream motor torque request—upstream
motor EM torque target As noted above, the upstream motor EM torque target may be based on the operational mode of the vehicle (e.g., performance mode, economy mode).

Then, following step 618, method 600 includes calculating a shaped TrnAin base torque request at step 620. The shaped engine base torque request may be calculated based on the filtered TrnAin base torque request, the TrnAin base torque limit, and the shaped TrnAin instantaneous torque request. The shaped engine base torque request may be calculated via an equation, such as Equation 7. Equation 7 may be as follows:

Shaped TrnAin base torque request=max(min(Filtered TrnAin base torque request,TrnAin base
torque limit),Shaped TrnAin instantaneous
torque request)

Then, following calculation of the shaped TrnAin base torque request at step 620, method 600 includes outputting the shaped engine base torque request at step 622. The shaped engine base torque request may be calculated via Equation 8, where Equation 8 is as follows:

Shaped engine base torque request=Shaped TrnAin
base torque request-P1 motor torque request In this way, during a tip-out event, the shaped base torque request leads the shaped instantaneous torque request, and the shaped base torque request is monotonically decreasing.

Following step 622, method 600 may end.

Output of the shaped engine base torque request at step 622 of method 600 may include outputting commands to one or more base torque actuators of the engine to achieve the shaped base torque request. The shaped base torque request may be a target base torque request to be achieved via adjustments to one or more base torque actuators of the engine. As mentioned above, the shaped base torque request includes a base torque reserve, where the base torque reserve is based on an accelerator pedal position and a pedal rate of change. Thus, by adjusting the one or more base torque actuators of the engine to achieve the shaped base torque request, the base torque reserve is formed.

The adjustments made to the one or more base torque actuators of the engine may be determined based on a look-up table accessible by a controller, such as controller 12. For example, the look-up table may include predetermined parameters for one or more of the base torque actuators (e.g., throttle position, waste gate valve, supercharger motor, and charge air cooler) that are associated with various amounts of base torque. Thus, outputting the shaped base torque request to the one or more base torque actuators of the engine may include outputting parameter requests to the one or more base torque actuators. For example, a position request may be sent to one or more of the throttle and the waste gate valve. Additionally or alternatively, a motor operation request may be output to a supercharger motor. Further, in at least one example, a cooling request may be output to a charge air cooler.

Turning back now to step 314 of method 300, one or more of the base torque actuators may be adjusted responsive to receiving the shaped base torque request output at step 312.

As explained in reference to FIG. 6, the shaped base torque request results in a base torque reserve being generated that is based on an accelerator pedal position and a pedal rate of change for a driver torque request.

The one or more base torque actuators adjusted at step 314 may include at least one of a throttle, turbocharger, and a charge air cooler. Adjusting the throttle may include adjusting a position of the throttle to a more open position (to increase an amount of air intake to the cylinders for combustion) or to a more closed position (to reduce an amount of air intake to the cylinders for combustion). Adjusting the turbocharger operation may include adjusting one or more of a waste gate valve operation and a motor rotating the turbocharger (in a supercharger configuration), for example. Adjusting the charge air cooler may include adjusting a cooling operation of the charge air cooler via flow of coolant through the charge air cooler, for example.

In this way, a base torque reserve may be formed based on an accelerator pedal position and a pedal rate of change. The technical effect of forming the base torque reserve based on the accelerator pedal position and the pedal rate of change is that the desired responsiveness of a torque request is taken into account. By taking into account the desired responsiveness of the torque request for the base torque reserve as disclosed herein, the resulting base torque reserve is large enough to ensure that an instantaneous torque command is delivered (e.g., a shaped instantaneous torque request) while being small enough to avoid unnecessary fuel economy degradation and NVH.

It is further noted that one or more instantaneous torque actuators may be adjusted at step 314, in accordance with the calculations performed at step 312. For example, the one or more instantaneous torque actuators may be adjusted in accordance with the shaped instantaneous torque request, also referred to as the shaped TrnAin instantaneous torque request, at step 606 of method 600.

After adjusting the base torque actuators at step 314, method 300 includes comparing an actual base torque to the shaped base torque request. For example, one or more parameters of the base torque actuators, as well as airflow information recorded via air flow sensors (e.g., mass air flow sensor 122) may be used to calculate the actual base torque.

If the actual base torque is less than the shaped base torque request at step 316 ("YES"), then method 300 includes further adjusting the base torque actuators to increase the actual base torque at step 318. For example, a throttle position may be adjusted to a more open position and/or a waste gate valve may be adjusted to a more closed position. Further, in at least one example, a supercharger motor may be adjusted to increase a compressor speed.

If the actual base torque is not less than the shaped base torque request at step 316 ("NO"), then method 300 includes comparing the actual base torque to the shaped base torque request and determining whether the actual base torque request is greater than the shaped base torque request at step 320.

Responsive to the actual base torque is greater than the shaped base torque request at step 320 ("YES"), then method 300 includes adjusting one or more base torque actuators to decrease the actual base torque at step 322. For example, a throttle position may be adjusted to a more closed position and/or a waste gate valve may be adjusted to a more open position. Further, in at least one example, a supercharger motor may be adjusted to decrease a compressor speed.

Alternatively, if the actual base torque is less than the shaped base torque request at step 320 ("NO"), then method 300 includes maintaining current vehicle operating conditions at step 324. That is, if the actual base torque is equal to the shaped base torque request. Method 300 may then end.

It is noted that in at least one example, there may be a tolerance about the shaped base torque request or a range may be requested for the shaped base torque. Thus, in such examples, rather than adjusting the base torque actuators to achieve an exact amount of base torque, the base torque actuators may instead be adjusted to achieve an amount of base torque within a predetermined range.

Turning now to FIG. 4, FIG. 4 shows a second example method 400 according to one or more embodiments of the present disclosure. It is noted that steps 402, 404, 406, 408, 410, 412, and 414, substantially correspond to steps 302, 304, 306, 308, 310, 312, and 314, respectively. As such, these steps are not further described at FIG. 4. Moreover, in at least one example, one or more elements of method 400 may be combined with method 300.

Looking to step 416 of method 400, a reduced driver torque request is received after adjusting base torque actuators responsive to a shaped base torque request and while an instantaneous torque is less than the driver torque request.

The reduced driver torque request at step 416 may be received via a tip-out event, in which an accelerator pedal is moved in an opposite direction as during a tip-in event. However, though the driver torque request is reduced at step 416, it is noted that the driver torque request is still positive at step 416.

Following step 416, step 418 of method 400 may include re-calculating torque commands (e.g., shaped instantaneous torque and shaped base torque requests). The re-calculation of torque commands may be carried out via the approach disclosed at FIG. 6, in at least one example. The re-calculated torque commands at step 418 include taking into account an accelerator pedal position of the tip-out event and pedal rate of change of the tip-out event. That is, similar to calculating the pedal position and the pedal rate of change of the tip-in event, the pedal position of the tip-out event may be based on a PP signal (see FIG. 1) output by the accelerator pedal.

The position of the accelerator pedal at the end of the tip-out event is indicative of an amount of torque output reduction that is desired. Where a tip-in event may include moving the accelerator pedal from the first position to the second position (see FIG. 3), the tip-out event at step 416 may include detecting movement of the accelerator pedal from the second position to a third position. Moving the accelerator pedal from the first position to the second position may include depression of the accelerator pedal in a first direction, while moving the accelerator pedal from the second position to the third position may include moving the accelerator pedal in a second direction that is opposite of the first direction. The pedal rate of change of the tip-out event may thus be based on a rate of change from the second position to the third position for the accelerator pedal. The third pedal position and the pedal rate of change of the tip-out event may be used for calculating an amount of base torque reserve to generate. For example, the pedal position and pedal rate of changed may be used for such calculations via the approach at FIG. 6. Additional factors, such as one or more of a drive mode, a vehicle altitude, and a battery SOC may additionally or alternatively be taken into account.

Based on the re-calculated results, a first updated instantaneous torque request output at step 418 differs from the instantaneous torque request calculated at step 412. The first updated instantaneous torque request calculated at step 418 is reduced compared to the instantaneous torque request calculated at step 412. The re-calculated torque commands at step 418 result in a shaped base torque request which is the same as the shaped base torque request calculated at step 412, however.

After re-calculating the torque commands at step 418, method 400 includes adjusting one or more base torque actuators and one or more instantaneous torque actuators at step 420. In particular, the one or more base torque actuators may be adjusted using a shaped based torque as was output at step 412. The one or more instantaneous torque actuators may be adjusted based on the first updated shaped instantaneous torque request, which is different than the shaped instantaneous torque request calculated at step 412. In particular, the first updated shaped instantaneous torque request is reduced compared to the shaped instantaneous torque request calculated at step 412. The instantaneous torque actuators include one or more of motors and spark timing, for example.

In particular, during the re-calculation at step 418, the reduction in the driver torque request results in a reduction of the unfiltered TrnAin base torque request. However, the shaped base torque request that is actually used to adjust the base torque actuators remains unchanged. This is due to the rate of change of the filtered TrnAin base torque request being limited to non-negative values, as discussed at step 614 of method 600.

Limiting the rate of change of the TrnAin base torque request to non-negative values ensures the shaped base torque command ultimately output is monotonically increasing in the time interval during which the engine is delivering the propulsive torque requested by the driver. A shaped instantaneous torque used to control instantaneous torque actuators (e.g., motors, spark timing) may be changed during the re-calculation step at step 418 in a non-monotonic manner, however. Therefore, the reduced driver torque request may be satisfied by way of adjustment to the instantaneous torque actuators based on the first updated instantaneous torque request, where the instantaneous torque actuators output a reduced torque.

That is, due to the rate of change of the base torque request for the TrnAin being limited to non-negative values, if a reduced driver torque request is received while the instantaneous torque is less than the driver torque request, the shaped base torque request will remain the same. The reduced driver torque request is then met by way of reducing an output of the instantaneous torque actuators, such as motors and spark timing. The output of the instantaneous torque actuators is reduced via the first updated shaped instantaneous torque request being reduced compared to the shaped instantaneous torque request that was used prior to receiving the reduced driver torque request at 416.

For example, an output of one or motors (e.g., 52, 252*a*, 252*b*, 252*c*) may be decreased to satisfy the reduced driver torque request. Additionally or alternatively, actuators of ignition spark plug (e.g., spark plug 192) may be controlled to adjust spark timing. For example, the spark timing may be retarded. Additionally or alternatively, brakes of the engine may also be used to satisfy the negative driver torque request. It is noted that satisfying or meeting the reduced driver torque request refers to decreasing a torque output to wheels of the vehicle such that a vehicle speed is decreased to a threshold vehicle speed.

Therefore, in method 400, the change from a tip-in event to a reduced driver torque request (e.g., a tip-out event) involves changing the shaped instantaneous torque request to a first updated shaped instantaneous torque request; however, the shaped base torque request remains the same.

After adjusting the base torque actuators based on the same shaped base torque request at step 420, and adjusting the instantaneous torque actuators based on the first updated instantaneous torque request at step 420, method 400 includes comparing the actual base torque to the shaped base torque request at step 422.

If the actual base torque is less than the shaped base torque request at step 422 ("YES"), then method 400 includes further adjusting the base torque actuators to increase the actual base torque at step 424. For example, a throttle position may be adjusted to a more open position and/or a waste gate valve may be adjusted to a more closed position. Further, in at least one example, a supercharger motor may be adjusted to increase a compressor speed.

If the actual base torque is not less than the shaped base torque request at step 422 ("NO"), then method 400 includes comparing the actual base torque to the shaped base torque request and determining whether the actual base torque request is greater than the shaped base torque request at step 426.

Responsive to the actual base torque is greater than the shaped base torque request at step 426 ("YES"), method 400 includes adjusting one or more base torque actuators to decrease the actual base torque at step 428. For example, a throttle position may be adjusted to a more closed position and/or a waste gate valve may be adjusted to a more open position. Further, in at least one example, a supercharger motor may be adjusted to decrease a compressor speed.

Alternatively, if the actual base torque is less than the shaped base torque request at step 426 ("NO"), then method 400 includes maintaining current vehicle operating conditions at step 430. That is, if the actual base torque is equal to the shaped base torque request. Method 400 may then end.

It is noted that in at least one example, there may be a tolerance about the shaped base torque request or a range may be requested for the shaped base torque. Thus, in such examples, rather than adjusting the base torque actuators to achieve an exact amount of base torque, the base torque actuators may instead be adjusted to achieve an amount of base torque within a predetermined range.

Turning to FIG. 5, FIG. 5 shows a third example method 500. In at least one example, one or more steps from method 500 may be combined with one or more steps from method 300 and/or method 400. It is noted that steps 502, 504, 506, 508, 510, 512, 514, 516, 518, and 520 of method 500 substantially correspond to steps 402, 404, 406, 408, 410, 412, 414, 416, 418, and 420 of method 400, respectively.

However, one notable difference between step 416 of method 400 and step 516 of method 500 is that the reduced driver torque request at 516 is specifically a negative driver torque request. That is, while the driver torque request at 416 is a reduced driver torque request, this reduced driver torque request may be a positive driver torque request. In some examples, the reduced driver torque request at 416 being maintained as a positive driver torque request may indicate a desire for the vehicle speed to stay the same or be increased at a slower rate than the driver torque request indicated by the tip-in event at 410. In contrast, the reduced driver torque request at 516 is a negative driver torque request indicating a desire to reduce a vehicle speed. In cases of negative driver torque requests, it is noted that one or both of a shaped base torque and base torque reserve may be reduced. For example, the shaped base torque may be decreased in a monotonic manner.

Turning now to step 520 of method 500, step 522 includes receiving a change in a driver torque request from the negative driver torque request received at 516 to a positive driver torque request. Thus, the change in the driver torque request at step 520 is a request to change from reducing a vehicle speed to increasing a vehicle speed. Such a change in the driver torque request may occur by a tip-in event being followed by a tip-out event, and (while the torque actuators are still being adjusted responsive to a negative torque request of the tip-out event) having another tip-in event take place.

Scenarios in which a step increase in a driver request takes place from a negative value to a positive value, such as at step 522, involve a lash crossing scenario to satisfy the change in driver torque request. Thus, in previous approaches, NVH such as clunk would occur to an impact during such lash crossing scenarios.

In the current disclosure, however, responsive to receiving the change in driver torque request from a negative driver torque request to a positive driver torque request at 522, method 500 includes re-calculating torque commands at step 524. For example, the torque commands (e.g., shaped instantaneous torque request and shaped base torque request) may be re-calculated in accordance with the approach disclosed at method 600. Via the re-calculation at step 524, it is noted that the shaped base torque is a same value as calculated at steps 512 and 518 of method 500. Further, the re-calculation at step 524 results in a second updated shaped instantaneous torque request being output, where the second updated shaped instantaneous torque request differs from the first updated shaped instantaneous torque request output at step 520.

Following re-calculation of the torque commands at step 524, method 500 includes adjusting one or more base torque actuators and adjusting one or more instantaneous torque actuators at step 526. In particular, the value re-calculated for the shaped base torque request at step 524 may be the same value as calculated at steps 512 and 518. Thus, the one or more base torque actuators may be adjusted based on the same shaped base torque request at step 526. That is, the one or more base torque actuators may be adjusted based on the same shaped base torque request at step 526 as was calculated at steps 512 and 518.

It is noted that the shaped base torque request re-calculated at step 526 is the same value for similar reasons as discussed with regards to step 614. Further, as the second updated shaped instantaneous torque request is to satisfy a change in the driver torque request from a negative driver torque request to a positive driver torque request, the second updated instantaneous torque request may be increased relative to the first updated instantaneous torque request. Thus, adjusting the one or more instantaneous torque actuators at step 526 based on the second updated instantaneous torque request may include adjustment to increase a torque output. For example, an output of one or motors (e.g., 52, 252a, 252b, 252c) may be increased to satisfy the change in the driver torque request received at step 522. Additionally or alternatively, actuators of ignition spark plug (e.g., spark plug 192) may be controlled to adjust spark timing. For example, the spark timing may be advanced.

Thus, overall, monotonic control of the base torque is realized via the approach disclosed herein, whereas instantaneous torque may be non-monotonic under certain conditions (changes back and forth between positive and negative driver torque requests. Following step 526, method 500 may end.

Turning now to FIG. 7, FIG. 7 shows an example timeline 700 for a vehicle, in particular an HEV, according to one or more examples of the present disclosure. In at least one example, the timeline 700 is drawn to scale, although other relative amounts of base torque, torque reserve, instantaneous torque, and vehicle speed may be used.

The x-axis of timeline 700 represents a shared time axis for the base torque reserve, base torque, driver torque request, shaped instantaneous torque, DCT, and vehicle speed plots. The time begins at the left portion of the x-axis and goes to the right. Thus, events are shown sequentially from left to right on the x-axis. Earlier events are further left, and later events are further right along the x-axis. For the base torque reserve, base torque, driver torque request, and instantaneous torque plots, it is noted that an amount of torque increases in a direction from bottom to top along the y-axis. That is, the point at which the x-axis and the y-axis meet for each of the base torque reserve, base torque, driver torque request, and instantaneous torque plots represents the lowest torque value of the plot and the torque value increases from the bottom to the top. In the case of the driver torque request plot, it is noted that the driver torque request plot includes a zero torque value axis 710, which represents a zero driver torque request. A zero driver torque request is a condition in which neither a positive nor a negative torque is requested to the wheels of the vehicle. Thus, torque values above the zero torque value axis 710 represent positive driver torque requests and torque values below the zero torque value axis 710 represent negative driver torque requests.

Turning now to time t0 to t1 of timeline 700, driver torque request 708 is a positive driver torque request. Such a positive driver torque request may include input to an accelerator pedal of the vehicle, such as input device 132 shown in FIG. 1. The positive driver torque request may thus represent a tip-in event in at least one example. Alternatively, the driver torque request 708 from t0 to t1 may be due to a lack of input to the accelerator pedal of the vehicle, and the driver request torque 708 from t0 to t1 may instead represent creep of the vehicle.

Due to driver torque request 708 being a relatively low positive driver torque request from t0 to t1, the driver torque request at t0 to t1 may be met via instantaneous torque 712 and the DCT 714 may remain in an open position. The instantaneous torque 712 may be controlled via a shaped instantaneous torque request similar to those as discussed at FIGS. 3, 4, 5, and 6, in at least one example. The DCT 714 being in an open position disconnects an engine of the vehicle from providing torque to the wheels of the vehicle. Thus, the open position of the DCT 714 from t0 to t1 indicates that the engine is not providing torque to the wheels of the vehicle. The vehicle speed 716 thus increases from t0 to t1 only by way of the torque provided to wheels of the vehicle via instantaneous torque 710. The instantaneous torque may thus be provided by way of one or more motors of the vehicle. For example, motor 252a may provide instantaneous torque to the wheels of the vehicle.

It is noted that as the engine (e.g., engine 10) is not providing torque to the wheels of the vehicle at times t0 to t1, no shaped base torque request 706 for the engine is commanded and no base torque reserve is generated 702. As discussed above, base torque and base torque reserve represent engine air path torque. Thus, put another way, shaped engine air torque request 706 is not commanded from t0 to t1 and engine air torque reserve 702 is not generated from time t0 to t1. That is, base torque may also be referred to herein as engine air torque.

At t1, a driver tip-in occurs as shown by the increase in driver torque request 708. Responsive to the tip-in, the DCT 714 is closed thus coupling the engine to a remainder of the vehicle powertrain. That is, by closing DCT 714 at time t1, the engine is now able to output torque to the wheels of the vehicle. It is noted that, the DCT 714 may be closed at t1 as part of an engine start event responsive to the increase in driver torque request 708 at time t1. Further, a shaped base torque request 706 is output starting at time t1, as the engine is now operations. Responsive to the shaped base torque request 706, one or more base torque actuators are adjusted. For example, one or more of a throttle and a waste gate valve (e.g., throttle 162, waste gate valve 163) may be positioned at time t1 to increase an amount of air charge. Though not shown at FIG. 7, in at least one example, the instantaneous torque 712 may be controlled to be negative immediately prior to closing of the DCT at t1 for purposes of efficiently managing a battery SOC, as discussed with regards to steps 308, 408, and 508 of FIGS. 3, 4, and 5, respectively.

The base torque reserve 702 and an actual base torque 704 begin to increase at time t1 due to operation of the engine based on the shaped base torque request 706. That is, as discussed above with reference to FIGS. 4 to 6, one or more base torque actuators are adjusted based on shaped base torque. Thus, by operating the vehicle and adjusting one or more base torque actuators based on shaped base torque request 706, an actual base torque 704 is generated and a base torque reserve 702 (reserve air charge) is generated. It is noted that the shaped base torque request 706 takes into account a steady state engine torque target to avoid unnecessary overshoot of the base torque reserve 702 and actual base torque 704 that would lead to degraded fuel economy. The shaped base torque request 706 may be calculated in accordance with the approach discussed at FIG. 6, in at least one example.

From t1 to t2, the vehicle speed 716, base torque reserve 702, shaped base torque request 706, actual base torque 704, and instantaneous torque 712 all increase in response to the driver torque request 708 tip-in event.

From t2 to t3, the driver torque request 708 decreases during a condition in which both base torque and instantaneous torque are being used to satisfy a driver torque request. That is, the driver torque request 708 decreases during a condition in which the instantaneous torque 712 has converged with the driver torque request. Such is analogous to steps 416 and 516 in FIGS. 4 and 5, respectively. Responsive to this situation, the shaped base torque request 706 is maintained and the adjustments for the one or more base torque actuators are continued to be made based on the same shaped base torque request. The instantaneous torque 712 is further decreased from t1 to t2 to address the decrease in driver torque request 708. The result of such an approach is that the base torque rate of change monotonically increases, while the instantaneous torque is controlled in a non-monotonic manner.

From t3 to t4, the base torque reserve 702, shaped base torque request 706, actual base torque 704, driver torque request 708, instantaneous torque 712, and the vehicle speed 716 all remain approximately the same.

From t4 to t5 the driver torque request decreases as part of a tip-out event to the point that the driver torque request is a negative driver torque request. In some examples, this tip-out event may include input to a brake of the vehicle. Such a negative driver torque request as shown from t4 to t5 indicates a request to reduce a speed of the vehicle. To satisfy the negative driver torque request from t4 to t5, the instantaneous torque is reduced. The base torque reserve 702 continues to increase, as the actual base torque 704 is maintained the same while the instantaneous torque 712 is decreased after receiving the negative driver torque request between t4 and t5.

From t5 to t6, the driver torque request 712 is further decreased and then sustained at a negative value. Thus, the instantaneous torque 712 is decreased accordingly and then maintained. The shaped base torque 706 and the actual base torque 704 are maintained the same between t5 and t6. Due to the instantaneous torque 712 decreasing and then being sustained at the same negative value while the actual base torque 704 is maintained the same, the base torque reserve 702 correspondingly increases and then is maintained at the same between t5 to t6. The vehicle speed decreases between t5 and t6.

At t6, another driver tip-in request is received with a relatively fast pedal rate of change. That is, the driver torque request 708 changes from a negative value to a positive value. Responsive to the change from the negative driver torque request to the positive driver torque request at t6, the instantaneous torque 712 is increased. A spark timing of an engine may be advanced to increase instantaneous torque output. Additionally, an output of one or more motors may be increased.

The advanced spark timing of the engine may deplete the base torque reserve 702 from t6 to t7. Although the shaped base torque 706 is increased substantially due to a relatively fast pedal rate of change during the tip-in event at t6, the actual base torque 704 of the vehicle has not increased sufficiently to maintain the same base torque reserve 702 between t6 and t7 (though the actual base torque 704 does increase from t6 to t7).

From t7 to t8, the driver torque request 708 stays the same and the vehicle speed 716 is steadily increased by way of the instantaneous torque 712, which is decreased. Between t7 and t8, the actual base torque 704 is further increased towards the shaped base torque 706 and the base torque reserve 702 is able to be increased.

At t8, a negative driver torque request 708 is received to stop the vehicle. For example, the negative driver torque received at t8 may be an input to the brake. Between t8 and t9, the DCT 714 is opened, and the vehicle speed 716 is decreased to zero. Thus, the instantaneous torque 712, base torque reserve 702, shaped base torque 706, and actual base torque 704 are also reduced to zero.

From t9 to t10, a positive driver torque request 708 is received. Thus, instantaneous torque 712 of the vehicle (provided by way of motors) is increased to satisfy a driver torque request 708 between t9 and t10 and the DCT is maintained open. As the motors provide the torque to satisfy the positive driver torque request between t9 and t10, the shaped base torque 706, the actual base torque 704, and the base torque reserve 702 are indicated to be zero, as the engine is in an off mode.

At step t10, the engine is started and the DCT is closed to couple engine torque output to wheels of the vehicle. Thus, a shaped base torque 706 is output at t10 and one or more base torque actuators (e.g., throttle, waste gate valve, etc. discussed in FIGS. 1 and 2) are adjusted to increase the actual base torque 704 and the base torque reserve 702 from t10 to t11. The driver torque increase at t10 was received with a higher pedal rate of change and is a higher torque request than the driver torque request received at t1. Thus, it is noted that the base torque reserve 702 is increased more aggressively responsive to the driver torque request 708 at t10 as compared to the driver torque request 708 at t1. In at least one example, it is noted that the instantaneous torque 712 may be controlled to be negative immediately prior to closing of the DCT at t10 for purposes of efficiently managing a battery SOC, as discussed with regards to FIGS. 3, 4, and 5.

Thus, disclosed herein are systems and methods for coordinating HEV base torque that achieve several advantages. In particular, during tip-ins, the approaches described herein establish an appropriate base torque reserve by taking into account a desired responsiveness of the tip-in; shape the base torque request by taking into account the shaped instantaneous torque request of the engine and the shaped torque request/s of the motor/s; ensure that the shaped base torque request is monotonically increasing in the time interval during which the engine is delivering the propulsive torque requested by the driver; and ensure that the shaped base torque request does not overshoot a desired steady-state value.

Establishment of a sufficient torque reserve is of particular interest since, as mentioned before, the engine is a slow actuator due to its slow airpath dynamics. If the torque reserve is too small, then the shaped instantaneous torque request may not be delivered. If the torque reserve is too large, then either the engine would be operating inefficiently (which results in fuel wastage, since the spark timing of the engine would be substantially different from the maximum brake torque (MBT) spark timing), or the system would have to compensate for the additional torque by reducing the torque request/s of the motor/s (which is difficult to accomplish due to the possibility of inducing clunk and shuffle).

As to shaping engine base torque request to be coordinated with the shaping of the motor/s torque request/s, these features are included as each actuator may be required to deliver different values and rates of torques, based on the driver request, the energy management (EM) request, etc.

As to ensuring a monotonic rate of change increase of the shaped base torque request, the shaped base torque request is not decreased when delivering the propulsive torque during a tip-in, e.g., a negative driver torque request to a positive driver torque request; or during a scenario where a positive driver torque request is reduced but the driver torque request is still positive. Such an approach avoids irregular or erratic changes in the engine base torque cause clunk and shuffle.

By preventing the engine shaped base torque request from overshooting a steady state target (see 706 at FIG. 7), unnecessary wastage of fuel is avoided.

Further, during tip-out events (that is, a negative torque request), the disclosure herein ensures that the shaped base torque request leads the shaped instantaneous torque request, and the disclosure herein ensures that the shaped base torque request is monotonically decreasing.

The lead of the engine shaped base torque request during tip-out events ensures that the engine is able to pump down the manifold pressure fast enough to prevent a run-on-feel, i.e., a temporary increase of the vehicle acceleration at the onset of a tip-out, due to the unsatisfactorily slow reduction of the actuator torque. Further, the lead of the engine base torque further ensures that when tipping out to closed pedal, the engine is able to enter the deceleration fuel shut-off (DFSO) operating mode quickly, thus, as before, facilitating the conservation of fuel.

As to ensuring the shaped base torque request is monotonically decreased during a tip-out event, such an approach avoids irregular or erratic changes in the engine base torque cause clunk and shuffle.

In at least one example, a method a described herein may be a vehicle operating method, comprising generating a base torque reserve for an engine based on a position of an accelerator pedal and a position rate of change of the accelerator pedal, for example. In a first example of the method, the base torque reserve is an air reserve of the engine generated by the engine, and wherein the position of the accelerator pedal and the position rate of change of the accelerator pedal are based on input received during a tip-in event or a tip-out event. In a second example of the method which optionally includes the first example, the base torque reserve is generated by calculating a shaped base torque and adjusting one or more of a throttle position and a waste gate valve position of the engine based on the shaped base torque. In a third example of the method, which optionally includes one or both of the first and second examples, the shaped base torque is monotonically increased during a tip-in condition. In a fourth example of the method, which optionally includes one or more of the first through third examples, the shaped base torque is monotonically decreased during a tip-out condition. In a fifth example of the method, which optionally includes one or more of the first through fourth examples, an amount of the base torque reserve generated is increased as the position rate of change of the accelerator pedal is increased.

In a sixth example of the method, which optionally includes one or more of the first through fifth examples, the method may further comprise receiving a negative driver torque request via a second position of the accelerator pedal and a second position rate of change of the accelerator pedal; re-calculating powertrain torque requests based on the second position of the accelerator pedal and the second position rate of change of the accelerator pedal; continuing to adjust the one or more of the throttle position and the waste gate valve position based on the shaped base torque; and changing an output torque to wheels of the powertrain via one or more of a motor of the powertrain and a spark timing of the engine responsive to the powertrain torque requests re-calculated based on the second position of the accelerator pedal and the second position rate of change of the accelerator pedal. In a seventh example of the method, which optionally includes one or more of the first through sixth examples, the method may further comprise receiving a positive driver torque request via a third position of the accelerator pedal and a third position rate of change of the accelerator pedal; re-calculating the powertrain torque requests based on the third position of the accelerator pedal and the third position rate of change of the accelerator pedal; continuing to adjust the one or more of the throttle position and the waste gate valve position based on the shaped base torque; and changing the output torque to wheels of the powertrain via one or more of a motor of the powertrain and a spark timing of the engine responsive to the powertrain torque requests re-calculated based on the second position of the accelerator pedal and the second position rate of change of the accelerator pedal.

A further method is also provided herein, which may include any one or more of the features described above with reference to the previous method. The further method may include receiving a driver torque request via an accelerator pedal; calculating a shaped base torque, wherein the shaped base torque includes base torque reserve calculations based on a position of the accelerator pedal and a pedal rate of change; and adjusting a throttle of an engine based on the shaped base torque to generate the base torque reserve. In a first example of the further method, the shaped base torque is monotonically increased during a tip-in condition of the accelerator pedal, and wherein the shaped base torque is monotonically decreased during a tip-out condition of the accelerator pedal. In a second example of the further method, which may optionally include the first example, the further method additionally comprises receiving an updated position of an accelerator pedal and an updated position rate of change of the accelerator pedal requesting; re-calculating torque requests based on the updated position of the accelerator pedal and the updated position rate of change of the accelerator pedal; and continue to adjust the throttle based on a same shaped base torque. In a third example of the further method, which optionally includes one or both of the first and second examples, the updated position of the accelerator pedal and the updated position rate of change of the accelerator pedal transition a driver torque request from a positive driver torque request to a negative driver torque request. In a fourth example of the further method, which optionally includes one or more of the first through third examples, the updated position of the accelerator pedal and the updated position rate of change of the accelerator pedal transition a driver torque request from a negative driver torque request to a positive driver torque request. In a fifth example of the further method, which optionally includes one or more of the first through fourth examples, the base torque reserve is an air torque reserve of the engine. In a sixth example of the further method, which optionally includes one or more of the first through fifth examples, the shaped base torque is maintained below a steady-state value, wherein the steady-state value is a predetermined limit for the shaped base torque that prevents unnecessary fuel consumption.

Additionally, a vehicle system is disclosed herein. It is noted that the vehicle system may include instructions on a controller to carry out any one or combination of the example method described herein. The vehicle system may comprise a powertrain including an internal combustion engine and at least one motor; an accelerator pedal; and a controller with computer readable instructions stored on non-transitory memory that when executed, cause the controller to: generate an air torque reserve for the internal combustion engine based on a position of the accelerator pedal and a position rate of change of the accelerator pedal. In a first example of the vehicle system, the controller further includes instructions which cause the controller to: generate the air torque reserve by calculating a shaped base torque based on the position of the accelerator pedal and the position rate of change of the accelerator pedal; and adjust a throttle position of the engine based on the shaped base torque. In a second example of the vehicle system, which optionally includes the first example, the controller further includes instructions which cause the controller to monotonically increase the shaped base torque responsive to a tip-in condition. In a third example of the vehicle system, which optionally includes one or both of the first and second examples, the controller further includes instructions which cause the controller to monotonically decrease the shaped base torque responsive to a tip-out condition. In a fourth example of the vehicle system, which optionally includes one or more of the first through third examples, the controller further includes instructions which cause the controller to: receive an updated position of an accelerator pedal and an updated position rate of change of the accelerator pedal requesting a vehicle speed change; re-calculate torque requests for the powertrain based on the updated position of the accelerator pedal and the updated position rate of change of the accelerator pedal; and maintain adjustments to the throttle position based on the shaped base torque.

Further, in at least one example method (which may include any one or more of the features disclosed above), after an engine is connected to a driveline responsive to a tip-in, there may be a step increase in a driver TrnAin torque request. In such a scenario, via the approach herein, the shaped instantaneous TrnAin torque request is calculated by taking into account the motor slew-rate request (see FIG. 6). In order to establish an appropriate base torque reserve, at the start of the step increase in driver request, the unfiltered TrnAin base torque request also exhibits a step increase, where this increase equals the desired base torque reserve. It is noted that the shaped base torque request may be set to a margin, referred to as a base margin, above the instantaneous torque for a tip-in event in at least one example, which may further impact the shaped base torque. For example, the base margin may be a calibratable function of the difference between the driver request and the shaped instantaneous request. Then, the shaped TrnAin base torque request ramps up to the unfiltered TrnAin base torque request. In order to shape the base torque request taking into account the instantaneous torque request of the engine and the shaped torque request/s of the motor/s, the ramp rate of this shaped base torque request takes into account the ramp rate of the shaped instantaneous torque request. The shaped TrnAin base torque request further rides (is maintained at) the TrnAin base torque limit, which results in the engine shaped base torque request riding a steady-state engine torque target. If the shaped TrnAin base torque request does not meet the base torque limit, then the engine base torque unnecessarily overshoots the steady state engine torque target. Furthermore, a slope of the TrnAin base torque limit increases, since the system increases the ramp rate of a motor torque request (e.g., motor 252a) in order to prevent the shaped TrnAin base torque request from exceeding the TrnAin base torque limit. When the shaped TrnAin base torque request converges to the driver request, the motor torque request also converges to a steady-state EM motor torque target.

In another example method, which optionally includes any one or all of the features described above, during a tip-in scenario which involves a change-of-mind of the driver where the driver torque request reduces before the shaped TrnAin instantaneous torque request converges to the aforementioned request, the shaped TrnAin base torque request remains unchanged. However, as mentioned above, the unfiltered base torque request reduces. The same reduction of the driver request results in the reduction of the unfiltered TrnAin base torque request. Such features advantageously ensure that the shaped base torque request is monotonically increasing in the time interval during which the engine is delivering propulsive torque requested by a driver.

In an even further example method, which also may optionally include any one or all of the features described above, a step increase in the driver request takes place may be received from a negative value to a positive value. That is a negative driver torque request and then a positive driver torque request may be received. Thus, re-calculation of the shaped base torque request is carried out (for example, as in methods 400 and 500). The instantaneous torque request further follows a non-monotonic trajectory in such situations, such that a reduced instantaneous torque request (e.g., a negative instantaneous torque request) is output to a motor of the powertrain to manage a backlash crossing immediately followed by an increased instantaneous torque request being output to the motor.

That is, in such scenarios which involve the crossing of the lumped TrnAin backlash, the shaped TrnAin instantaneous torque request follows a non-monotonic trajectory by having a reduced instantaneous torque request followed by an increased torque request in order to quickly cross the backlash, and, in addition, also maintain the impact speed (i.e., clunk) at an acceptable level. Due to the reduction of this instantaneous torque prior to the impact, the unfiltered TrnAin base torque request reduces. However, to maintain a monotonic increase of the actual base torque, the shaped TrnAin base torque request remains unchanged. Note that, in such scenarios, the base torque reserve allows the engine to provide a sufficient amount of torque to the driveline at the end of the lash crossing, so that the rebounding of the driveline into backlash is prevented. The behavior for the case of tip-out can be described similarly as above but instead maintain a monotonic decrease of the shaped base torque request.

As discussed herein, the present disclosure relates to methods and systems that modify the airpath torque of an internal combustion engine of an HEV, relative to a request, in order to deliver torque to the wheels in a smooth, consistent, efficient, and connected manner. The modification of the airpath torque is carried out based on the instantaneous torques of the actuators of the drivetrain, accelerator pedal position, brake pedal position, rate of change of accelerator pedal position, rate of change of brake pedal position, driver selected drive mode, inferred (from driver behavior) drive mode, vehicle altitude, battery SOC, and transmission gear. The approach disclosed herein selects an engine airpath torque reserve based on the urgency of the tip-in/tip-out (which is ascertained using the pedal positions and rates), distribution of the torque request amongst the actuators of the drivetrain, drive mode, vehicle altitude, battery SOC, and a transmission gear. Via the approach disclosed herein, coordination among the TrnAin actuators and the other actuators of the drivetrain and also ensure more accurate and more consistent delivery of the engine torque.

In at least one example, the airpath reserve may be calculated in accordance with Equation 2. In some examples, an airpath torque reserve rate-limit may be based on the urgency of a tip-in/tip-out, distribution of a driver torque request amongst the actuators of the drivetrain, a drive mode, a vehicle altitude, a battery SOC, and transmission gear. In this way, the technical effect of improved coordination among the TrnAin actuators and the other actuators of the drivetrain is achieved compared to previous approaches. Moreover, improved accuracy and more consistent delivery of the engine torque results.

In one or more examples, the rate-limit of the airpath torque reserve may be calculated in accordance with the approach discussed at Equation 5. In this way, the engine airpath torque is prevented from overshooting the steady-state value. Thus, improved engine operational efficiency results.

In at least one example, the approach disclosed herein may prevent overshoot by enforcing the base torque limit, such as the base torque limit calculated in accordance with Equation 6. Additionally or alternatively, the approach disclosed herein may prevent overshoot by modifying a ramp rate of the P1 motor torque request (such as motor 252b). Increasing the ramp rate of the P1 motor torque request may prevent the TrnAin base torque request (such as calculated via Equation 1) from exceeding the TrnAin base torque limit (such as calculated via Equation 6).

The approach disclosed herein further ensures that, during a driver change-of-mind and/or a lash crossing, the engine airpath torque exhibits monotonic behavior. Thus, torque is delivered to the wheels in a consistent and connected manner. The approach disclosed herein further ensure that, after the engine is connected to the driveline, the trajectory of the P1 motor torque (such as motor 252b) is monotonic. In this way, improved coordination between the P1 motor and the engine for the purpose of accurate and consistent delivery of the torque results.

Moreover, the approach disclosed herein ensures that, just prior to the engine being connected to the driveline during a tip-in, the P1 motor torque is negative for purposes of managing the battery SOC effectively.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle operating method, comprising:
generating a base torque reserve for an engine of a vehicle based on a position of an accelerator pedal and a position rate of change of the accelerator pedal, the base torque reserve generated by calculating a shaped base torque and adjusting one or more of a throttle position and a waste gate valve position based on the shaped base torque;
operating the vehicle in a condition that includes receiving a driver tip-in request followed by receiving a driver reduction in torque request;
while operating the vehicle, maintaining the shaped base torque unchanged responsive to the condition so that the base torque reserve monotonically increases for a duration of the condition, the duration including both the driver tip-in request and the driver reduction in torque request received during the condition;
during a further condition, receiving a negative driver torque request via a second position of the accelerator pedal and a second position rate of change of the accelerator pedal;
re-calculating powertrain torque requests for a powertrain of the vehicle based on the second position of the accelerator pedal and the second position rate of change of the accelerator pedal, the powertrain of the vehicle including the engine and a motor of the vehicle; and
managing a backlash crossing by adjusting an instantaneous torque request based on the re-calculated powertrain torque, wherein the re-calculated powertrain torque requests include a reduced instantaneous torque request to the motor of the powertrain immediately followed by an increased instantaneous torque request to the motor of the powertrain.

2. The vehicle operating method of claim 1, wherein the base torque reserve is an air path torque.

3. The vehicle operating method of claim 1, wherein an amount of the base torque reserve generated is increased as the position rate of change of the accelerator pedal is increased.

4. The vehicle operating method according to claim 3, further comprising:

during further condition,
continuing to adjust the one or more of the throttle position and the waste gate valve position based on the shaped base torque; and
changing an output torque to wheels of the powertrain via one or more of the motor of the powertrain and a spark timing of the engine responsive to the powertrain torque requests re-calculated based on the second position of the accelerator pedal and the second position rate of change of the accelerator pedal.

5. The vehicle operating method according to claim 4, further comprising:
receiving a positive driver torque request via a third position of the accelerator pedal and a third position rate of change of the accelerator pedal;
re-calculating the powertrain torque requests based on the third position of the accelerator pedal and the third position rate of change of the accelerator pedal;
continuing to adjust the one or more of the throttle position and the waste gate valve position based on the shaped base torque; and
changing the output torque to wheels of the powertrain via one or more of the motor of the powertrain and the spark timing of the engine responsive to the powertrain torque requests re-calculated based on the second position of the accelerator pedal and the second position rate of change of the accelerator pedal.

6. A vehicle operating method, comprising:
receiving a driver torque request via an accelerator pedal of a vehicle;
calculating a shaped base torque, wherein the shaped base torque includes calculations for a base torque reserve based on a position of the accelerator pedal and a pedal rate of change, and wherein the shaped base torque is further calculated based on one or more of a drive mode, a vehicle altitude, a battery state of charge (SOC), and a transmission gear;
adjusting a throttle of an engine based on the shaped base torque to generate the base torque reserve;
operating the vehicle in a condition that includes receiving a driver tip-in request followed by receiving a driver reduction in torque request;
while operating the vehicle in the condition, maintaining the shaped base torque unchanged responsive to the condition so that the shaped base torque monotonically increases fora duration of the condition, the duration including both the driver tip-in request and the driver reduction in torque request received during the condition;
during a further condition, receiving a negative driver torque request via a second position of the accelerator pedal and a second position rate of change of the accelerator pedal;
re-calculating powertrain torque requests for a powertrain of the vehicle based on the second position of the accelerator pedal and the second position rate of change of the accelerator pedal, the powertrain of the vehicle including the engine and a motor of the vehicle; and
managing a backlash crossing by adjusting an instantaneous torque request based on the re-calculated powertrain torque, wherein the re-calculated powertrain torque requests include a reduced instantaneous torque request to the motor of the powertrain immediately followed by an increased instantaneous torque request to the motor of the powertrain.

7. The vehicle operating method of claim 6, further comprising:
receiving an updated position of the accelerator pedal and an updated position rate of change of the accelerator pedal requesting;
re-calculating torque requests based on the updated position of the accelerator pedal and the updated position rate of change of the accelerator pedal; and
continue to adjust the throttle based on a same shaped base torque.

8. The vehicle operating method of claim 7, wherein the updated position of the accelerator pedal and the updated position rate of change of the accelerator pedal transition the driver torque request from a positive driver torque request to a negative driver torque request.

9. The vehicle operating method of claim 7, wherein the updated position of the accelerator pedal and the updated position rate of change of the accelerator pedal transition the driver torque request from a negative driver torque request to a positive driver torque request.

10. The vehicle operating method of claim 6, wherein the shaped base torque is maintained below a steady-state value, wherein the steady-state value is a predetermined limit for the shaped base torque that prevents unnecessary fuel consumption.

11. A vehicle system, comprising:
a powertrain of a vehicle including an internal combustion engine and at least one motor;
a transmission;
an accelerator pedal; and
a controller with computer readable instructions stored on non-transitory memory that when executed, cause the controller to:
receive a driver torque request, the driver torque request determined based on a position of the accelerator pedal and a position rate of change of the accelerator pedal, and
generate an air torque reserve for the internal combustion engine based on the position of the accelerator pedal and the position rate of change of the accelerator pedal by calculating a shaped base torque based on the position of the accelerator pedal and the position rate of change of the accelerator pedal, wherein the air torque reserve is a base torque reserve;
operate the vehicle in a condition that includes receiving a driver tip-in request followed by receiving a driver reduction in torque request; and
while operating the vehicle in the condition, maintain the shaped base torque unchanged responsive to the condition so that the base torque reserve monotonically increases for a duration of the condition, the duration including both the driver tip-in request and the driver reduction in torque request received during the condition;
during a further condition, receive a negative driver torque request via a second position of the accelerator pedal and a second position rate of change of the accelerator pedal;
re-calculate powertrain torque requests for a powertrain of the vehicle based on the second position of the accelerator pedal and the second position rate of change of the accelerator pedal, the powertrain of the vehicle including the engine and a motor of the vehicle; and
manage a backlash crossing by adjusting an instantaneous torque request based on the re-calculated powertrain torque, wherein the re-calculated powertrain torque requests include a reduced instantaneous torque request to the motor of the powertrain immediately followed by an increased instantaneous torque request to the motor of the powertrain.

12. The vehicle system of claim 11, wherein the controller further includes instructions which cause the controller to:
adjust a throttle position of the internal combustion engine based on the shaped base torque.

13. The vehicle system of claim 12, wherein the shaped base torque is further calculated based on one or more of a drive mode, a vehicle altitude, a battery state of charge (SOC), and a transmission gear.

14. The vehicle system of claim 12, wherein the shaped base torque is further calculated based on a drive mode and a base torque limit.

15. The vehicle system of claim 14, wherein the shaped base torque is further calculated based on a rate-limit of the air torque reserve and coordination of actuators of the powertrain to deliver the driver torque request,
wherein the actuators of the powertrain including the internal combustion engine and the at least one motor, and
wherein the at least one motor includes a motor positioned downstream of the transmission.

16. The vehicle operating method of claim 1, wherein an instantaneous torque is controlled in a non-monotonic manner when operating the vehicle in the condition.

17. The vehicle operating method of claim 16, wherein the instantaneous torque is used to control one or more of a spark timing of the engine of the vehicle and a motor of the vehicle.

18. The vehicle operating method of claim 1, wherein an instantaneous torque is increased responsive to the driver tip-in request and decreased responsive to the driver reduction in torque demand during the condition.

19. The vehicle system of claim 11, wherein the driver reduction in torque demand during the condition is still an overall positive drive torque request.

20. The vehicle system of claim 19, wherein the controller further includes instructions which cause the controller to:
during a further condition, operate the vehicle during a driver tip-out event, where the driver tip-out event is an overall negative drive torque request; and
decrease the shaped base torque and then decrease an instantaneous torque request in response to the driver tip-out event during the further condition, wherein the decrease in the shaped base torque leads the decrease in the instantaneous torque request during the further condition, and wherein the decrease in the shaped base torque is a monotonic decrease during the further condition.

* * * * *